US008046156B2

(12) United States Patent
Moriya et al.

(10) Patent No.: US 8,046,156 B2
(45) Date of Patent: Oct. 25, 2011

(54) CONTROL APPARATUS OF INTERNAL COMBUSTION ENGINE

(75) Inventors: Hidenori Moriya, Susono (JP); Ryo Tadokoro, Okegawa (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 229 days.

(21) Appl. No.: 12/527,565

(22) PCT Filed: Feb. 19, 2008

(86) PCT No.: PCT/JP2008/053132
§ 371 (c)(1),
(2), (4) Date: Oct. 23, 2009

(87) PCT Pub. No.: WO2008/102905
PCT Pub. Date: Aug. 28, 2008

(65) Prior Publication Data
US 2010/0071659 A1    Mar. 25, 2010

(30) Foreign Application Priority Data

Feb. 19, 2007  (JP) .................................. 2007-037921

(51) Int. Cl.
*F02P 5/153* (2006.01)
*F02M 7/28* (2006.01)
(52) U.S. Cl. .................... 701/111; 123/435; 123/406.41; 123/90.15
(58) Field of Classification Search ........ 701/103–105, 701/111; 123/406.22, 406.26, 406.41, 406.45, 123/435, 672, 90.15
See application file for complete search history.

(56) References Cited

U.S. PATENT DOCUMENTS

| 5,715,794 | A  |   | 2/1998  | Nakamura et al. |
| 5,765,530 | A  | * | 6/1998  | Machida et al. ......... 123/406.43 |
| 6,502,549 | B1 |   | 1/2003  | Hoshino et al. |
| 7,290,529 | B2 |   | 11/2007 | Suzuki et al. |
| 7,870,844 | B2 | * | 1/2011  | Moriya et al. ............ 123/406.45 |
| 7,870,845 | B2 | * | 1/2011  | Sasaki et al. .................. 123/435 |

FOREIGN PATENT DOCUMENTS

| JP | 8 312407     |   | 11/1996 |
| JP | 11 93716     |   | 4/1999  |
| JP | 2000 54889   |   | 2/2000  |
| JP | 2002 256925  |   | 9/2002  |
| JP | 2006 144645  |   | 6/2006  |
| JP | 2006 200396  |   | 8/2006  |
| JP | 2008-202460  | * | 9/2008  |

* cited by examiner

*Primary Examiner* — Hai Huynh
(74) *Attorney, Agent, or Firm* — Oblon, Spivak, McClelland, Maier & Neustadt, L.L.P.

(57) ABSTRACT

This control apparatus estimates a full combustion correspondence period CP, which is the period from an ignition timing SA to a combustion completion time CAe, and controls a VVT advancement amount (burnt gas quantity, overlap period, intake valve open timing) such that the estimated full combustion correspondence period CP coincides with a constant target full combustion correspondence period CPtgt. The full combustion correspondence period CP substantially maintains a one-to-one relation with the VVT advancement amount at which HC, $CO_2$, etc. start to increase, even when the ignition timing SA changes. Thus, even when the ignition timing changes, the burnt gas quantity (overlap period) can be properly controlled. As a result, without increasing the discharge quantities of HC and CO, the discharge quantity of $NO_X$ can be reduced. In addition, pumping loss can be reduced, whereby fuel consumption can be improved.

10 Claims, 16 Drawing Sheets

CONTROL APPARATUS OF INTERNAL COMBUSTION ENGINE

TECHNICAL FIELD

The present invention relates to a control apparatus for an internal combustion engine which includes ignition means for igniting a gas mixture within each combustion chamber at an ignition timing corresponding to an operation state of the internal combustion engine to thereby burn the gas mixture, and burnt (exhausted) gas quantity control means for controlling the quantity of a burnt gas contained in the gas mixture.

BACKGROUND ART

Conventionally, there has been known a control apparatus for an internal combustion engine which calculates a combustion ratio MFB (Mass Fraction Burned or Burnt) on the basis of a cylinder pressure (pressure within a combustion chamber) detected by cylinder pressure detection means, and controls ignition timing (combustion start time) such that the combustion ratio MFB at a predetermined crank angle coincides with a target combustion ratio. Such an apparatus is configured to control the ignition timing SA such that the combustion ratio MFB8 at a crank angle 8° after compression TDC becomes 50%. Thus, even in the case where individual differences are present among internal combustion engines, appropriate ignition timing is provided to each engine. Accordingly, combustion efficiency is improved, and each internal combustion engine can output an increased torque (see, for example, Japanese Patent Application Laid-Open (kokai) No. 2006-144645).

The combustion ratio MFB is substantially equal to a ratio of indicated heat quantity. The ratio of indicated heat quantity is defined as a ratio Qsum/Qtotal in a single combustion stroke, where Qtotal is the total quantity of heat which is a portion of heat generated by all fuel burnt in a combustion chamber and which was converted to work for a piston, and Qsum is a cumulative quantity of heat which is a portion of heat generated by fuel burnt in the combustion chamber until a predetermined timing and which was converted to work for the piston. The combustion ratio MFB is defined as a ratio of a cumulative quantity of fuel which is a portion of fuel burnt in the combustion chamber until the predetermined timing and which contributed to work for the piston, to the total quantity of fuel which is a portion of all fuel burnt in the combustion chamber and which contributed to work for the piston.

Meanwhile, there is widely known an internal combustion engine which includes a variable valve timing apparatus (VVT) which can control the open and close timings of intake valves and/or exhaust valves. One of such variable valve timing apparatuses controls a period in which both the intake valves and the exhaust valves are maintained open (hereinafter referred to as the "valve overlap period" or "overlap period") by advancing or delaying the open timing of the intake valves.

In general, prolongation of the overlap period results in an increase in the quantity of a burnt gas which is discharged from a combustion cumber to an intake port and is again taken into the combustion cumber (the burnt gas is also called "internal EGR gas" or "self EGR gas"). In other words, the variable valve timing apparatus functions as a burnt gas quantity control apparatus.

When the burnt gas quantity is increased by means of a burnt gas quantity control apparatus such as the variable valve timing apparatus or an external EGR apparatus, combustion speed decreases. That is, as shown in FIG. 15, the quantity of heat which is a portion of heat generated by fuel burnt in a combustion chamber and which contributed to work for a piston (indicated generated heat quantity) increases at a slower rate when the burnt gas quantity is relatively large (the inclination of a curve indicated by a solid line of FIG. 15), as compared with the case where the burnt gas quantity is relatively small (the inclination of a curve indicated by a broken line of FIG. 15). That is, as the burnt gas quantity increases, combustion speed decreases. As a result, combustion temperature lowers, whereby the quantity of discharged $NO_X$ decreases.

Moreover, when the burnt gas quantity increases, combustion progresses more gradually, whereby the combustion period is prolonged. Accordingly, a greater quantity of fuel can be burnt. That is, a period T1 of FIG. 15 becomes longer than a period T2, so that a total heat quantity Qtotal1 corresponding to the total quantity of burnt fuel becomes greater than a total heat quantity Qtotal2. As a result, as the burnt gas quantity increases, the quantities of discharged HC and CO become smaller. However, when the burnt gas quantity is excessive, combustion becomes instable. As a result, the quantities of HC and CO increase.

DISCLOSURE OF THE INVENTION

From the above-described phenomena, the inventor perceived that if the quantity of a burnt gas contained in a gas mixture can be increased to a possible extent within a range in which the quantities of HC, CO, etc. do not increase, the quantity of discharged $NO_X$ can be reduced without causing an increase in the quantities of HC and CO. Further, the inventor perceived that, in the case where the burnt gas quantity is adjusted by means of changing the overlap period, if the quantity of the burnt gas can be increased to a possible extent within a range in which the quantities of HC, CO, etc. do not increase, pumping loss can be reduced without causing an increase in the quantities of HC and CO.

Thus, the inventor has proposed to control the burnt gas quantity (control the overlap period) such that a change amount of the combustion ratio (that is, combustion speed) within a period between compression TDC and 15° after compression TDC (ATDC 15°) becomes equal to a predetermined value which is set to be as small as possible within a range in which the quantities of HC and CO do not increase. This control can reduce the quantity of discharged $NO_X$, while preventing an increase in the quantities of discharged HC and CO due to instable combustion. It should be noted that, in the present specification, a crank angle X° after compression TDC will be referred to as "ATDC X°" or "ATDCX," and a crank angle Y° before compression TDC will be referred to as "BTDC Y°" or "BTDCY."

However, through various investigations the inventor has found that, even in the case where the burnt gas quantity (the overlap period) is controlled such that the change amount of the combustion ratio in the period between the compression TDC and the ATDC 15° is maintained at the above-described predetermined value, the quantities of discharged HC and CO change, in some cases, under the different ignition timings.

More specifically, maintaining the change amount of the combustion ratio in the period between compression TDC and ATDC 15° at the predetermined value means that a period (hereinafter referred to as the "actual combustion period CPa") between a point in time when combustion substantially starts after ignition and a point in time when the combustion ends is rendered equal to a predetermined crank angle duration (extent); that is, it means maintaining the combustion speed at a predetermined speed.

Therefore, while changing the ignition timing, the inventor measured the relation between the amount of advancement of the opening timing of the intake valves controlled by the variable valve timing apparatus (hereinafter referred to as the "VVT advancement amount"), and the quantities of discharged $CO_2$ and HC and the actual combustion period CPa. The VVT advancement amount is an amount of advancement of the opening timing of the intake valves, in relation to the most delayed opening timing of the intake valves, for the case where the open and closing timings of the exhaust valves are maintained constant. Accordingly, as described above, as the VVT advancement amount increases, the length of the overlap period increases, and thus, the burnt gas quantity increases. FIG. 3 is a graph showing results of the measurement.

In the measurement, as shown in FIG. 16, a period between a crank angle CAs and a crank angle CAe was used as the actual combustion period CPa. The crank angle CAs is defined as follows. The maximum value of the change amount of the combustion ratio within a predetermined crank angle extent (e.g., a crank angle extent of 15°) after start of combustion is obtained, and the change of the combustion ratio is extrapolated by a straight line Lext which passes through a point where the maximum value is obtained and whose inclination coincides with the maximum value. A crank angle corresponding to a point Ps at which the straight line Lext intersects a horizontal line corresponding to a 0% combustion ratio is defined as the crank angle CAs. The crank angle CAe is a crank angle corresponding to a point Pe at which the straight line Lext intersects a horizontal line corresponding to a 100% combustion ratio. The quantity of fuel corresponding to the 100% combustion ratio is the total amount of fuel which is a portion of fuel burnt within a combustion chamber from the timing when the intake valves have been closed till the time when the crank angle has reached ATDC 60°, and which contributed to work for the piston. Further, in the measurement whose results are shown in FIG. 3, the ignition timing was changed such that a combustion ratio MFB8, which is a combustion ratio at ATDC 8°, became 20%, 30%, 40%, or 50%. In FIG. 3, a decrease in $CO_2$ represents an increase in CO.

As can be understood from FIG. 3, when an attempt is made to maximize the VVT advancement amount within the range in which the quantities of HC and CO do not increase (see a region A in FIG. 3), the actual combustion period CPa varies as indicated in a region B when the ignition timing changes. In other words, when the VVT advancement amount is feedback-controlled such that the actual combustion period CPa coincides with an optimal target combustion period in a state in which ignition is performed at a certain ignition timing, the burnt gas quantity can be controlled to a proper quantity at that ignition timing. However, when the ignition timing changes, the VVT advancement amount may become excessively large, resulting in an increase in the quantities of discharged HC and CO, or may become excessively small, resulting in an increase in the quantity of discharged $NO_X$ (not illustrated in FIG. 3).

In view of the above-described problem, an object of the present invention is to provide a control apparatus for an internal combustion engine which can properly control the burnt gas quantity even when the ignition timing changes, to thereby reduce the quantity of discharged $NO_X$ without increasing the quantities of discharged HC and CO.

A control apparatus for an internal combustion engine according to the present invention, which achieve the above-described object comprises:

ignition means for igniting a gas mixture within a combustion chamber of the engine at an ignition timing according to an operation state of the engine;

full-combustion-correspondence-period estimation means for estimating a full combustion correspondence period, which is a period between the ignition timing and a combustion completion time at which combustion of the gas mixture within the combustion chamber ends; and burnt-gas-quantity control means for controlling a quantity of a burnt gas contained in the gas mixture such that the estimated full combustion correspondence period coincides with a target full combustion correspondence period.

As shown in FIGS. 2 and 16, the full combustion correspondence period CP, which is estimated by the full-combustion-correspondence-period estimation means, is a period from the ignition timing SA to the combustion completion time CAe at which combustion of the gas mixture within the combustion chamber substantially ends. As shown in FIG. 3, this full combustion correspondence period CP hardly changes even when the ignition timing changes, as long as the VVT advancement amount (that is, the overlap period) is maintained constant, whereby the burnt gas quantity is maintained constant. Accordingly, in the case where, as in the above-described configuration, the burnt gas quantity is controlled such that the full combustion correspondence period CP coincides with a predetermined target full combustion correspondence period, the burnt gas quantity can be controlled to a proper value irrespective of the ignition timing. As a result, the control apparatus of the present invention can reduce the $NO_X$ discharge quantity without increasing the HC and CO discharge quantities.

In this case, preferably, the burnt-gas-quantity control means is configured to change an overlap period in which both intake and exhaust valves are open. Further, the burnt-gas-quantity control means is desirably configured to change the overlap period by changing at least the open timing of the intake valve of the engine.

These configurations enable the overlap period to be readily controlled to the longest period within a range in which the HC and CO discharge quantities do not increase. Accordingly, it is possible to reduce pumping loss, while avoiding an increase in the discharge quantities of HC, CO, and $NO_X$. As a result, the fuel consumption of the engine can be improved.

Preferably, the full-combustion-correspondence-period estimation means estimates the full combustion correspondence period in such a manner that the full combustion correspondence period is represented by a crank angle extent; and the burnt-gas-quantity control means feedback-controls the quantity of the burnt gas such that the full combustion correspondence period represented by the estimated crank angle extent coincides with a target crank angle extent predetermined as the target full combustion correspondence period.

As shown in the previously described FIG. 3, the full combustion correspondence period CP represented by a crank angle extent (the full combustion correspondence period represented in unit of crank angle) has a constant relation with the VVT advancement amount corresponding to the burnt gas quantity, without depending on the ignition timing. Accordingly, in the case where, as in the above-described configuration, the full combustion correspondence period is represented by a crank angle extent in advance and the quantity of the burnt gas is controlled (feedback-controlled) such that the full combustion correspondence period coincides with the target crank angle extent predetermined as the target full combustion correspondence period, the overlap period can be readily set to a proper period irrespective of the ignition timing.

The control apparatus of the present invention may comprise cylinder pressure detection means for detecting a cylinder pressure which is a pressure within the combustion chamber. In this case, the full-combustion-correspondence-period estimation means is configured to estimate the combustion completion time on the basis of the detected cylinder pressure.

More specifically, the full-combustion-correspondence-period estimation means may be configured to estimate, on the basis of the detected cylinder pressure, an indicated heat quantity ratio corresponding to a ratio Qsum/Qtotal, which is a ratio of a cumulative quantity Qsum of heat which is a portion of heat generated by fuel burnt within the combustion chamber until a predetermined timing and which was converted to work for (against) a piston to the total quantity Qtotal of heat which is a portion of heat generated by all fuel burnt within the combustion chamber and which was converted to work for (against) the piston; obtain the maximum value of a change amount of the indicated heat quantity ratio Qsum/Qtotal in a predetermined crank angle extent; and estimate the combustion completion time on the basis of the maximum value.

By virtue of this configuration, the combustion completion time can be estimated by a simpler method.

Meanwhile, the full-combustion-correspondence-period estimation means may be configured to obtain, as the indicated heat quantity ratio Qsum/Qtotal, a combustion ratio MFB as a function of the crank angle, the combustion ratio MFB being a ratio of a cumulative quantity of fuel which is a portion of fuel burnt within the combustion chamber until a predetermined timing and which contributed to work for (against) the piston to the total quantity of fuel which is a portion of all fuel burnt within the combustion chamber and which contributed to work for (against) the piston.

Since the indicated heat quantity ratio Qsum/Qtotal is substantially equivalent to the combustion ratio MFB, and the combustion ratio MFB can be obtained by use of the cylinder pressure, the above-described configuration enables the full combustion correspondence period to be estimated by use of a simpler method.

Preferably, the full-combustion-correspondence-period estimation means includes:

means for obtaining a parameter which affects combustion speed of the fuel; and modification means for modifying the full combustion correspondence period on the basis of the obtained parameter.

The combustion speed is affected by the quantity of air taken into the cylinder, the air-fuel ratio, the wall temperature of the cylinder, etc. The influences which the full combustion correspondence period receives from the parameters which affect the combustion speed are independent of the influence of the burnt gas quantity on the full combustion correspondence period. Accordingly, when the burnt gas quantity is controlled on the basis of the full combustion correspondence period and the target full combustion correspondence period, the influences of these parameters on the full combustion correspondence period must be eliminated. In view of this, as in the above-described configuration, a parameter which affects the combustion speed is obtained, and the estimated full combustion correspondence period is modified on the basis of the obtained parameter. Thus, even when the estimated full combustion correspondence period changes in accordance with the parameter which affects the combustion speed, the burnt gas quantity can be controlled more properly without correcting the target full combustion correspondence period.

Alternatively, the burnt-gas-quantity control means may include:

means for obtaining a parameter which affects combustion speed of the fuel; and target modification means for modifying the target full combustion correspondence period on the basis of the obtained parameter.

By virtue of this configuration, the target full combustion correspondence period is modified on the basis of the parameter which affects the combustion speed. Therefore, even when the estimated full combustion correspondence period changes in accordance with the parameter which affects the combustion speed, the burnt gas quantity can be controlled more properly.

In the control apparatus which estimates the combustion ratio, preferably, the ignition means includes ignition timing control means for controlling the ignition timing such that the combustion ratio at a predetermined crank angle coincides with (is made equal to) a target combustion ratio which is determined in accordance with the operation state of the engine.

This configuration can reduce the discharge quantity of $NO_X$ and/or pumping loss through control of the burnt gas quantity, without increasing the discharge quantities of HC and CO, while maintaining a high combustion efficiency through control of the ignition timing.

BEST MODE FOR CARRYING OUT THE INVENTION

A control apparatus for an internal combustion engine according to an embodiment of the present invention will be described with reference to the drawings.
(Configuration)

Figure 1:
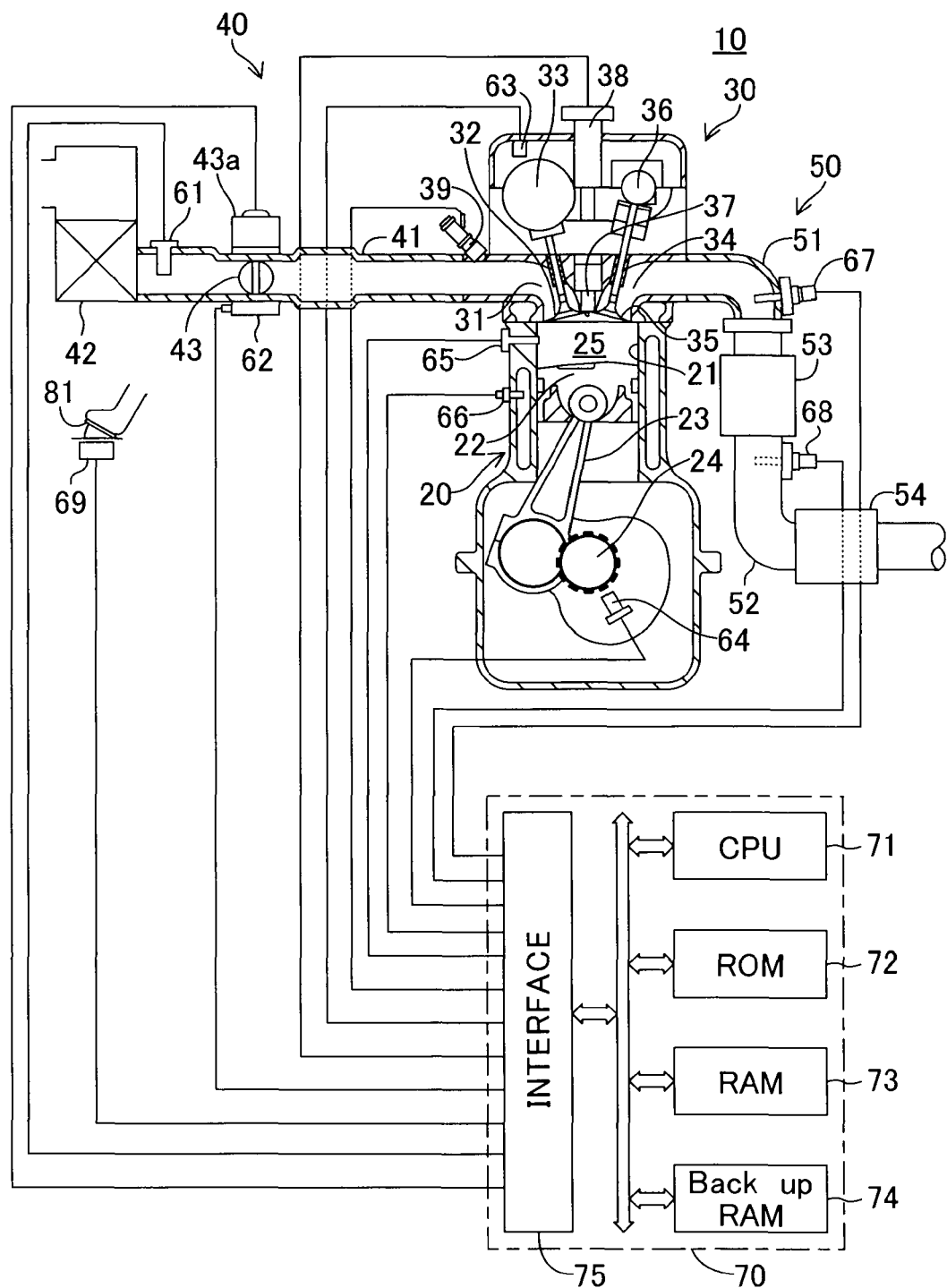
FIG. 1 is a schematic diagram of an internal combustion engine to which a control apparatus according to an embodiment of the present invention is applied.

FIG. 1 schematically shows the configuration of a system in which the control apparatus according to the embodiment of the present invention is applied to a piston-reciprocation-type spark-ignition multi-cylinder (4-cylinder) four-cycle internal combustion engine 10. Although FIG. 1 shows only a cross section of a specific cylinder, the remaining cylinders have the same structure.

This internal combustion engine 10 includes a cylinder block section 20 including a cylinder block, a cylinder block lower-case, an oil pan, etc.; a cylinder head section 30 fixed on the cylinder block section 20; an intake system 40 for supplying gasoline gas mixture to the cylinder block section 20; and an exhaust system 50 for discharging exhaust gas from the cylinder block section 20 to the exterior of the engine.

The cylinder block section 20 includes cylinders 21, pistons 22, connecting rods 23, and a crankshaft 24. Each of the pistons 22 reciprocates within the corresponding cylinder 21. The reciprocating motion of the piston 22 is transmitted to the crankshaft 24 via the respective connecting rod 23, whereby the crankshaft 24 is rotated. The cylinder 21 and the head of the piston 22 form a combustion chamber 25 in cooperation with the cylinder head section 30.

The cylinder head section 30 includes an intake port 31 communicating with the combustion chamber 25; an intake valve 32 for opening and closing the intake port 31; an intake-valve control apparatus 33 for driving the intake valve 32 so as to open and close the intake port; an exhaust port 34 communicating with the combustion chamber 25; an exhaust valve 35 for opening and closing the exhaust port 34; an exhaust cam shaft 36 for driving the exhaust valve 35; a spark plug 37; an igniter 38 including an ignition coil for generating a high voltage to be applied to the spark plug 37; and an injector (fuel injection means) 39 for injecting fuel into the intake port 31.

The intake-valve control apparatus 33 has a known structure for adjusting and controlling a relative rotational angle (phase angle) between an intake cam shaft and an intake cam (not shown) by means of oil pressure. Therefore, the intake-valve control apparatus 33 can adjust open timing of the intake valve 32 (intake valve open timing). In the present example, a valve open period (valve-opened crank angle extent) in which the intake valve is open is fixed. Accordingly, when the intake valve open timing is advanced or delayed by a predetermined angle, the intake valve close timing is also advanced or delayed by the predetermined angle. Further, the open and close timings of the exhaust valve 35 are fixed. Accordingly, when the intake-valve control apparatus 33 changes the intake valve open timing, the overlap period changes.

The intake system 40 includes an intake pipe 41 which includes an intake manifold communicating with the intake port 31 and forming an intake passage in cooperation with the intake port 31; an air filter 42 provided at an end portion of the intake pipe 41; a throttle valve 43 provided within the intake pipe 41 and adapted to change the opening cross sectional area of the intake passage; and a throttle valve actuator (throttle valve drive means) 43a composed of a DC motor.

The exhaust system 50 includes an exhaust manifold 51 communicating with the exhaust port 34; an exhaust pipe 52 connected to the exhaust manifold 51; an upstream three-way catalyst 53 disposed in the exhaust pipe 52; and a downstream three-way catalyst 54 disposed in the exhaust pipe 52 to be located downstream of the first catalyst 53. The exhaust port 34, the exhaust manifold 51, and the exhaust pipe 52 constitute an exhaust passage.

Meanwhile, this system includes a hot-wire air flowmeter 61; a throttle position sensor 62; a cam position sensor 63; a crank position sensor 64; a cylinder pressure sensor 65 provided for each cylinder; a cooling water temperature sensor 66; an air-fuel ratio sensor 67 disposed in the exhaust passage to be located upstream of the first catalyst 53; an air-fuel ratio sensor 68 disposed in the exhaust passage to be located downstream of the first catalyst 53 and upstream of the second catalyst 54; and an accelerator opening sensor 69.

The hot-wire air flowmeter 61 detects the mass flow rate (per unit time) of intake air flowing through the intake pipe 41, and outputs a signal representing the detected mass flow rate Ga. The throttle position sensor 62 detects the opening of the throttle valve 43, and outputs a signal representing the detected throttle valve opening TA. The cam position sensor 63 outputs one pulse when the intake cam shaft rotates 90 degrees from a predetermined angle, when it rotates 90 degrees more, and when it rotates 180 degrees more. This signal is also called a G2 signal. The crank position sensor 64 is designed to output a pulse every time the crankshaft 24 rotates 10 degrees. Pulses output from the crank position sensor 64 are converted to a signal representing engine rotational speed NE. The cylinder pressure sensor 65 detects pressure within the combustion chamber 25, and outputs a signal representing the detected cylinder pressure Pc.

The upstream air-fuel ratio sensor 67 and the downstream air-fuel ratio sensor 68 respectively detect the air-fuel ratio on the upstream side of the first catalyst 53 and that on the downstream side of the first catalyst 53, and output respective signals respectively representing the air-fuel ratio measured on the upstream side of the first catalyst 53 and the air-fuel ratio measured on the downstream side of the first catalyst 53. The accelerator opening sensor 69 detects an operation amount of an accelerator pedal 81 operated by a driver, and outputs a signal representing the detected operation amount Accp of the accelerator pedal 81.

An electric controller 70 is a microcomputer, which includes the following mutually bus-connected elements: a CPU 71; ROM 72 in which routines (programs) to be executed by the CPU 71, and tables (lookup tables, maps), constants, and the like are stored in advance; RAM 73 in which the CPU 71 temporarily stores data as needed; backup RAM 74, which stores data while power is held on and which retains the stored data even while power is held off; and an interface 75 including an AD converter. The interface 75 is connected to the sensors 61 to 69. Signals from the sensors 61 to 69 are supplied to the CPU 71 via the interface 75. In accordance with instructions from the CPU 71, the interface 75 sends out drive signals to the intake-valve control apparatus 33, the injectors 39, and the throttle valve actuator 43a; and also sends an ignition signal to each of the igniters 38.
(Control)

Next, there will be described the details of various controls performed by the control apparatus (hereinafter referred to as the "present apparatus") for the internal combustion engine 10, which is configured as described above.
<Estimation (Acquisition) of Combustion Ratio MFB>

The combustion ratio MFB, which is defined as described above, is estimated (obtained, acquired) as a value representing the ratio of indicated heat quantity Qsum/Qtotal, which is also defined as described above. The details of a method for obtaining the combustion ratio MFB from the cylinder pressure Pc detected by the cylinder pressure sensor 65 are disclosed in, for example, Japanese Patent Application Laid-Open (kokai) No. 2006-144645. Therefore, only the outline of the method will be described.

In the present example, the combustion ratio MFB is obtained as a function of the crank angle $\theta$ representing a predetermined timing. The combustion ratio MFB at the crank angle $\theta$ is represented as MFB$\theta$. The crank angle $\theta$ is defined as follows. The crank angle $\theta$ becomes zero at the compression TDC. The crank angle $\theta$ becomes a negative value when it is advanced from the compression TDC, and the absolute value of the crank angle $\theta$ increases with the amount of advancement in relation to the compression TDC. The crank angle $\theta$ becomes a positive value when it is delayed or retarded from the compression TDC, and the absolute value of the crank angle $\theta$ increases with the amount of retard in relation to the compression TDC. For example, $\theta = -\theta 1°$ ($\theta 1 > 0$) means that the crank angle is BTDC$\theta 1$.

The combustion ratio MFB$\theta$ at the crank angle $\theta$ is estimated by the following Eq. (1). In Eq. (1), a crank angle $\theta s$ ($\theta s < 0$) is an angle which is sufficiently advanced from the ignition timing. In addition, both the intake valve 32 and the exhaust valve 35 are closed in a process toward a combustion stroke (expansion stroke) of interest before the crank angle $\theta s$ (e.g., $\theta s = -60°$; that is, BTDC 60°). A crank angle $\theta e$ ($\theta e > 0$) is an angle which is delayed from a predetermined timing which is the latest timing of timings at which combustion in the combustion stroke of interest substantially ends. In addition, the crank angle $\theta e$ is an angle which is advanced from a timing at which the exhaust valve is opened after the combustion (e.g., $\theta e = 60°$; that is, ATDC 60°).

$$MFB\theta = \frac{Pc(\theta) \cdot V(\theta)^\kappa - Pc(\theta s) \cdot V(\theta s)^\kappa}{Pc(\theta e) \cdot V(\theta e)^\kappa - Pc(\theta s) \cdot V(\theta s)^\kappa} \quad (1)$$

This Eq. (1) is based on the knowledge that a change pattern of the cumulative quantity Q of heat approximately coincides with a change pattern of $Pc(\theta)V(\theta)^\kappa$, wherein the cumulative quantity Q of heat is a portion of generated heat and which contributed to work for (against) the piston. Pc ($\theta$) represents a cylinder pressure at the crank angle $\theta$; V ($\theta$) represents a volume of the combustion chamber 25 at the crank angle $\theta$; and $\kappa$ represents a specific-heat ratio of a gas mixture (e.g., 1.32). Notably, the denominator of Eq. (1) represents a value corresponding to the 100% MFB.
<Ignition Timing Control>

The ignition timing SA is feedback-controlled such that the MFB8 (the combustion ratio at ATDC 8°) becomes equal to a predetermined target value (e.g., a value near 50%). This target value of the MFB8 is determined in accordance with an operation state of the engine (e.g., a parameter which represents the operation state of the engine, such as engine load represented by, for example, the quantity of air taken into the cylinder during a single intake stroke and engine rotational speed) such that the combustion efficiency of the engine becomes high, and torque fluctuation or the like due to knocking or the like is not generated. As a result, the ignition timing SA changes in accordance with the operation state. Notably, the ignition timing SA (SA>0) means that ignition is performed at BTDC SA°.
<Control of VVT Advancement Amount (Burnt Gas Quantity, Overlap Period)>

The present apparatus obtains the full combustion correspondence period CP from the ignition timing SA and the combustion ratio MFB, and controls the VVT advancement amount (the opening timing of the intake valve) such that the full combustion correspondence period CP coincides with a predetermined target full combustion correspondence period CPtgt. In other words, the burnt gas quantity is controlled on the basis of the full combustion correspondence period CP.

The full combustion correspondence period CP is a period from the ignition timing SA to a combustion completion time CAe. The combustion completion time CAe is a time at which combustion of a gas mixture within the combustion chamber substantially ends. The combustion completion time CAe and the full combustion correspondence period CP are obtained as follows.

Figure 2:
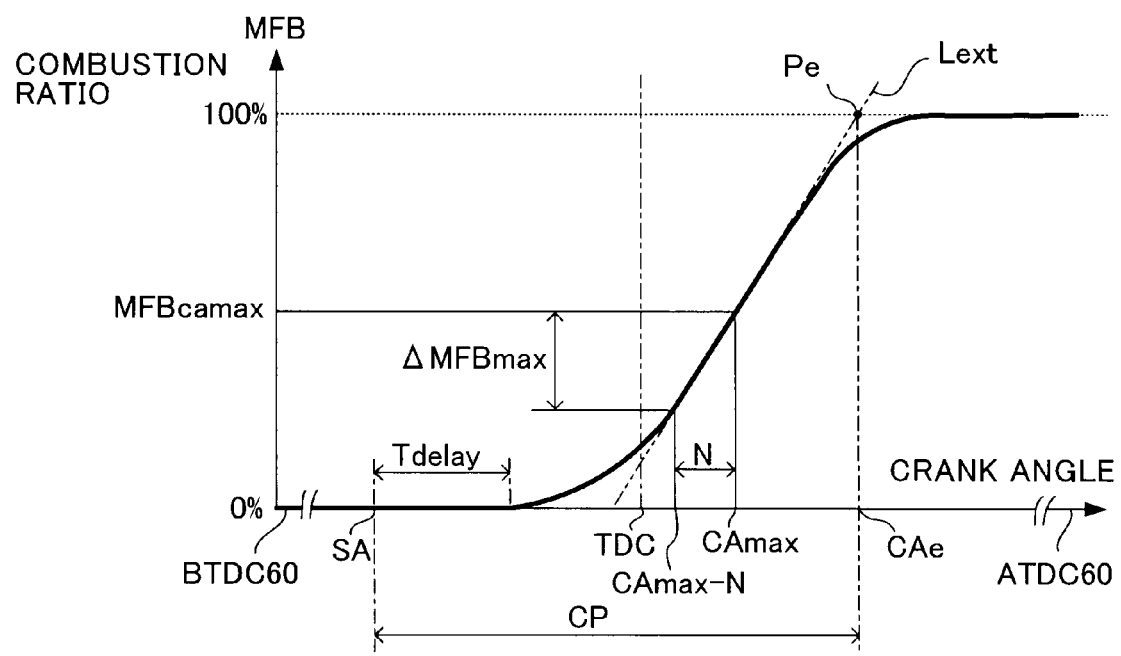
FIG. 2 is a graph showing a change in combustion ratio with crank angle in an expansion stroke (combustion stroke).

(1) As shown in FIG. 2, in a period between a point (e.g., BTDC) 60° at the advance side in relation to the most advanced ignition timing SA and a point (e.g., ATDC)60° at the delay side in relation to a point by which the slowest combustion ends, the change amount (increase amount) $\Delta$MFB of the combustion ratio MFB within a predetermined crank angle extent N° (e.g., a crank angle extent of 15°) is obtained every time the crank angle changes a predetermined minute amount.

(2) The largest value (the maximum value $\Delta$MFBmax) of the obtained change amounts $\Delta$MFB (the highest change speed of the combustion ratio) is obtained.

(3) A point corresponding to a crank angle CAmax at which the maximum value ΔMFBmax is obtained is determined on a curve which represents the combustion ratio MFB, and a straight line (extrapolation line) Lext is drawn which passes through the point ((crank angle, MFB)=(CAmax, MFBcamax)), and has an inclination corresponding to the maximum value ΔMFBmax.

(4) A crank angle CAe corresponding to a point Pe at which the straight line Lext intersects a horizontal line corresponding to the 100% combustion ratio is obtained as a combustion completion time CAe. Notably, the 100% combustion ratio corresponds to the total quantity of fuel which is a portion of all the fuel burnt within the combustion chamber during a period between the crank angle θs (BTDC 60°) and the crank angle θe (ATDC 60°) and which contributed to work for (against) the piston.

(5) The period (crank angle extent) from the ignition timing SA to the combustion completion time CAe is obtained as the full combustion correspondence period CP.

That is, the full combustion correspondence period CP is obtained by the following Eq. (2). The full combustion correspondence period CP is represented by a crank angle extent (the magnitude of crank angle, unit (°)).

$$CP = SA + CAmax + \frac{1 - MFBcamax}{(\Delta MFBmax/N)} \quad (2)$$

Figure 3:
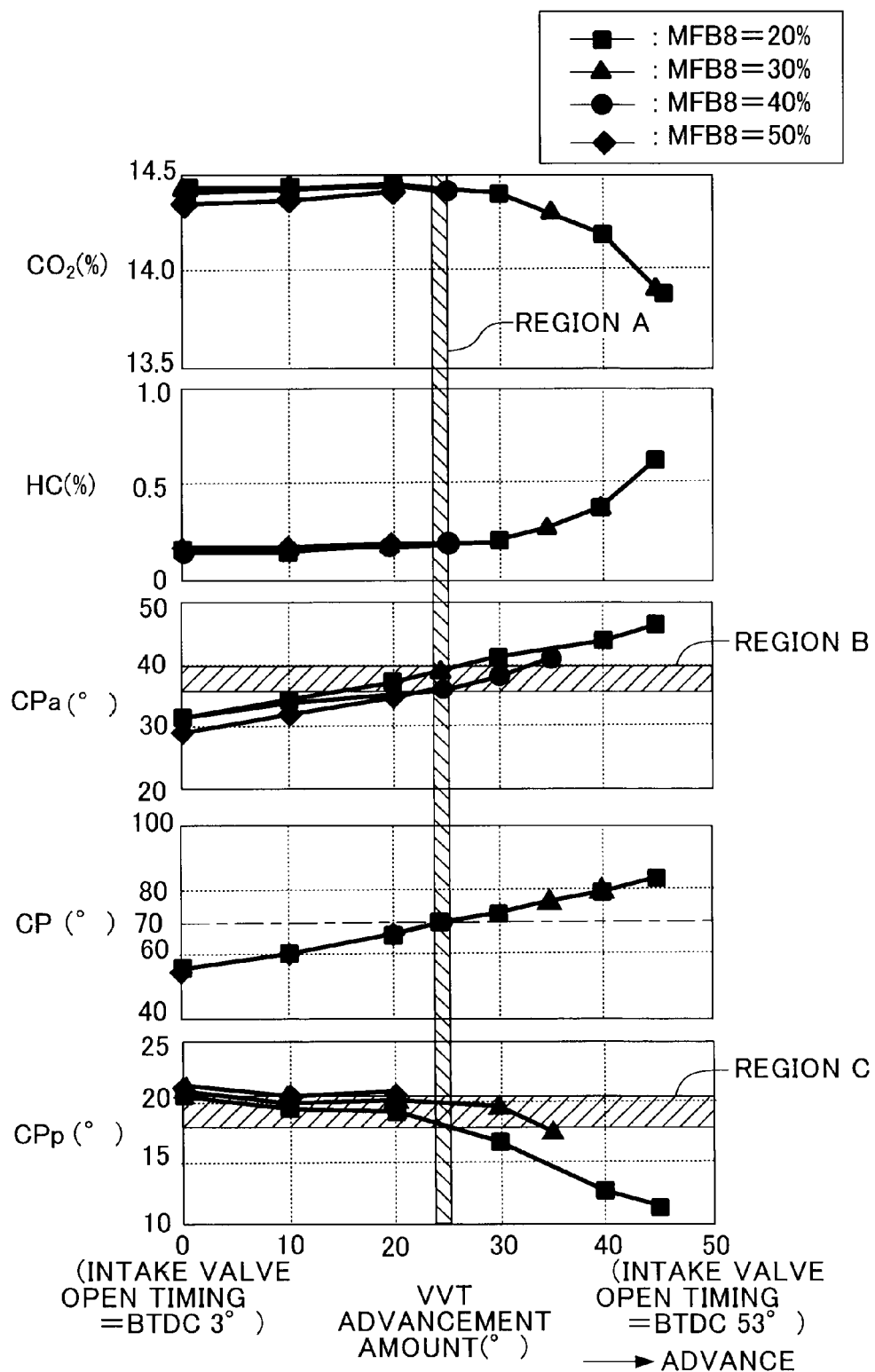
FIG. 3 is a graph showing, for different ignition timings, how VVT advancement amount affects $CO_2$ discharge quantity, HC discharge quantity, actual combustion period, full combustion correspondence period, and combustion period obtained from cylinder pressure.

FIG. 3 shows changes in the $CO_2$ discharge quantity, the HC discharge quantity, and the full combustion correspondence period CP with (with respect to) the VVT advancement amount. In this measurement, the ignition timing SA was changed such that the combustion ratio MFB8 became 20%, 30%, 40%, or 50%.

As can be understood from FIG. 3, even when the ignition timing SA changes, the VVT advancement amount and the full combustion correspondence period CP maintain a substantially one-to-one relation therebetween. In other words, in the case where the VVT advancement amount (the overlap period, the burnt gas quantity) is fixed to a certain value, the full combustion correspondence period CP hardly changes, even when the ignition timing SA changes. Accordingly, as indicated by a region A, in order to control the VVT advancement amount such that the VVT advancement amount becomes the largest (i.e., the overlap period becomes the longest and the burnt gas quantity becomes the maximum) within a range in which the CO and HC discharge quantities do not increase (i.e., within a range in which the $CO_2$ discharge quantity does not decrease and the HC discharge quantity does not increase), the VVT advancement amount must be controlled (feedback-controlled) such that the full combustion correspondence period CP coincides with the full combustion correspondence period CP in the region A (in the example of FIG. 3, 70°).

That is, the present apparatus controls the VVT advancement amount such that the full combustion correspondence period CP becomes equal to a predetermined target full combustion correspondence period CPtgt. The target full combustion correspondence period CPtgt is selected such that the overlap period becomes the longest within a range in which the CO and HC discharge quantities do not increase. As a result, the present invention can reduce the $NO_X$ discharge quantity and pumping loss, without increasing the HC and CO discharge quantities. Therefore, an internal combustion engine is provided from which small amount of exhaust gases is discharged and which shows excellent fuel consumption.

Figure 16:
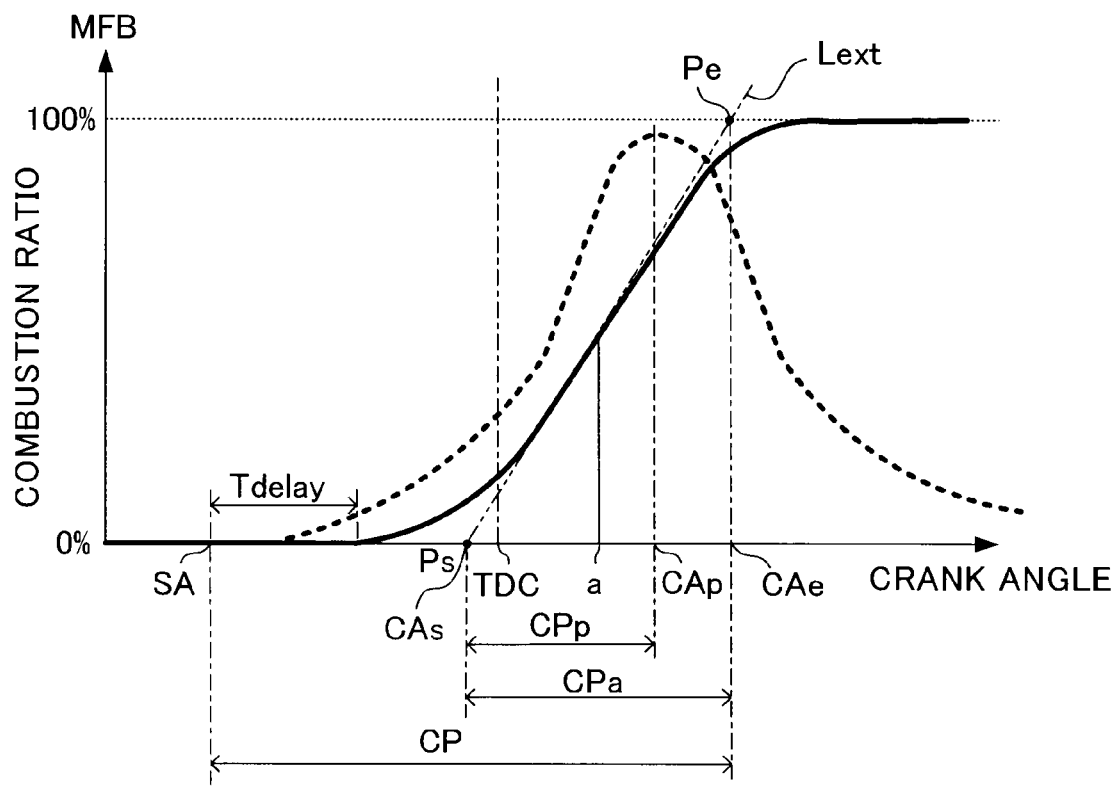
FIG. 16 is a graph showing changes in combustion ratio and cylinder pressure with respect to crank angle in the combustion stroke.

It should be noted that FIG. 3 also shows the relation between the VVT advancement amount and the above-described actual combustion period CPa, the relation between the VVT advancement and the combustion period CPp estimated on the basis of the cylinder pressure, as well as the relation between the VVT advancement amount and the $CO_2$, and the relation between the VVT advancement amount and HC discharge quantities. As shown in FIG. 16, the actual combustion period CPa corresponds to a crank angle extent in which the combustion ratio changes from 0% to 100% and which is determined by use of the straight line Lext. As shown in FIG. 16, the combustion period CPp estimated on the basis of the cylinder pressure is a period between the crank angle CAs and a crank angle CAp at which the cylinder pressure becomes the maximum value.

Under the different ignition timings, each of the actual combustion period CPa and the combustion period CPp estimated on the basis of the cylinder pressure varies in its value corresponding to a VVT advancement amount at which the $CO_2$ and HC discharge quantities start to increase (see respective values within regions B and C corresponding to the region A). Accordingly, using these values for the feedback control of the VVT advancement amount is considered undesirable.

Figure 4:
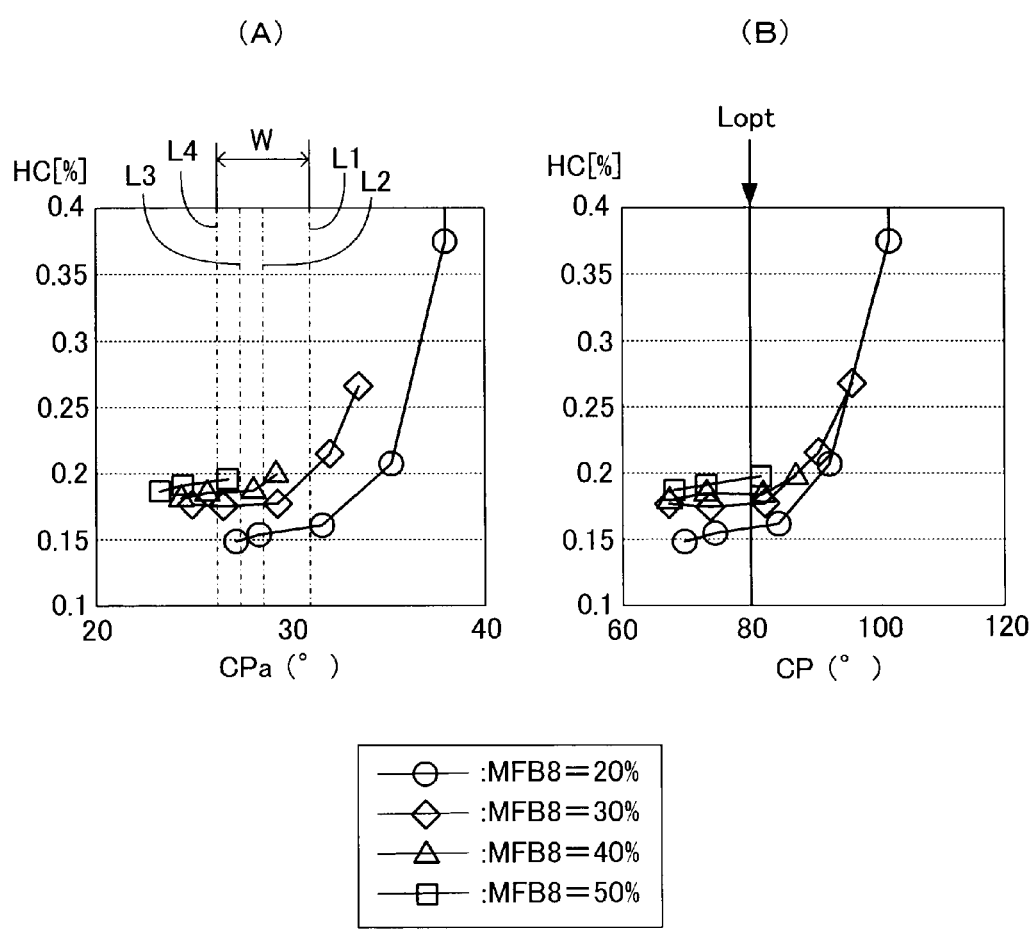
FIG. 4 is a pair of graphs showing changes in HC discharge quantity for different ignition timings SA, wherein (A) is a graph showing the relation between the HC discharge quantity and the actual combustion period, and (B) is a graph showing the relation between the HC discharge quantity and the full combustion correspondence period estimated by an apparatus of the present invention.

FIG. 4 is a pair of graphs showing the results of an experiment which was performed for a different engine 10 in order to confirm the effect of the present apparatus. Graph (A) of FIG. 4 shows the results obtained by measuring the relation between the actual combustion period CPa and the HC discharge quantity, under the different ignition timings SA. The ignition timing SA was changed such that the 8° combustion ratio MFB8 became 20%, 30%, 40%, or 50%.

According to graph (A) of FIG. 4, when the 8° combustion ratio MFB8 is 20%, 30%, 40%, or 50%, the optimal value of the actual combustion period CPa within a range in which the HC discharge quantity does not increase changes depending on the ignition timing SA, as indicated by straight lines L1, L2, L3, and L4. That is, the optimal value of the actual combustion period CPa changes within a range having a width W. In other words, even if the VVT advancement amount is feedback-controlled such that the actual combustion period CPa coincides with the optimal target combustion period in a state where ignition is performed at a certain ignition timing, the VVT advancement amount becomes excessively large or excessively small when the ignition timing changes. In such a case, the HC and CO discharge quantities may increase; or the $NO_X$ discharge amount may increase and the reduction amount of pumping loss may decrease.

Graph (B) of FIG. 4 shows the results obtained by measuring the relation between the HC discharge quantity and the full combustion correspondence period CP estimated by the present apparatus, under the different ignition timings SA. The ignition timing SA was changed in the same manner as in the case shown in graph (A) of FIG. 4.

According to graph (B) of FIG. 4, even when the ignition timing SA is changed such that the 8° combustion ratio MFB8 coincides with 20%, 30%, 40%, or 50%, the HC discharge quantity starts to increase at the same full combustion correspondence period CP; i.e., a single point indicated by a straight line Lopt. Accordingly, when a value of the full combustion correspondence period CP indicated by the straight line Lopt is used as the target full combustion correspondence period CPtgt and the VVT advancement amount is controlled such that the actually estimated full combustion correspondence period CP coincides with the target full combustion correspondence period CPtgt, the overlap period can be prolonged to a possible degree (the burnt gas quantity can be increased to a possible degree) within a range in which the HC discharge quantity (accordingly, the CO discharge quantity) does not increase, irrespective of the ignition timing SA. As a result, the present apparatus can reduce the $NO_X$ discharge quantity and pumping loss without increasing the HC and CO discharge quantities.

<Modification (Normalization) of Full Combustion Correspondence Period CP>

Incidentally, although the combustion speed greatly depends on the burnt gas quantity, there exist other parameters (physical quantities) which affect the combustion speed. Typical examples of the parameters which affect the combustion speed are fuel injection quantity TAU, cylinder wall temperature estimated from (represented by) cooling water temperature THW, and the air-fuel ratio of a gas mixture. Hereinbelow, there will be described influences of these parameters on the full combustion correspondence period CP and methods employed by the present apparatus so as to modify (normalize) the full combustion correspondence period CP.

(Modification on the Basis of Fuel Injection Quantity TAU)

Figure 5:
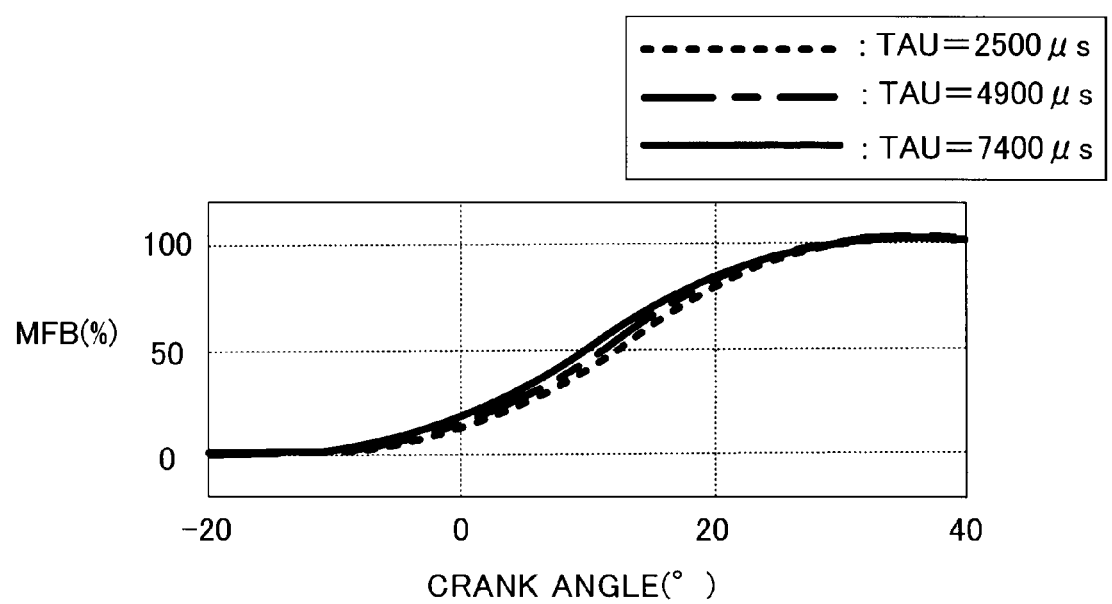
FIG. 5 is a graph showing how fuel injection quantity affects change in the combustion ratio.

FIG. 5 is a graph showing the change in the combustion ratio MFB under the different fuel injection quantities TAU. As shown in this graph, as the fuel injection quantity TAU increases, the concentration of the gas mixture, pressure, etc. within the combustion chamber increase, so that the combustion speed increases. As a result, the greater the fuel injection quantity TAU, the shorter the full combustion correspondence period CP. In order to control the burnt gas quantity to a proper quantity on the basis of the full combustion correspondence period CP and the target full combustion correspondence period CPtgt, the influence of the fuel injection quantity TAU on the full combustion correspondence period CP must be eliminated.

In view of the above, the present apparatus modifies the full combustion correspondence period in accordance with the following Eq. (3) so that the target full combustion correspondence period CPtgt, which is set under the assumption that the fuel injection quantity TAU is fixed to a certain value (in the present example, TAU=0), can be used as the target value of the feedback control as it is (without being changed). CPmfd represents the modified full combustion correspondence period.

$$CPmfd = CP \cdot \left(1 + \frac{TAU}{10000}\right) \quad (3)$$

$TAU(\mu s)$

Figure 6:
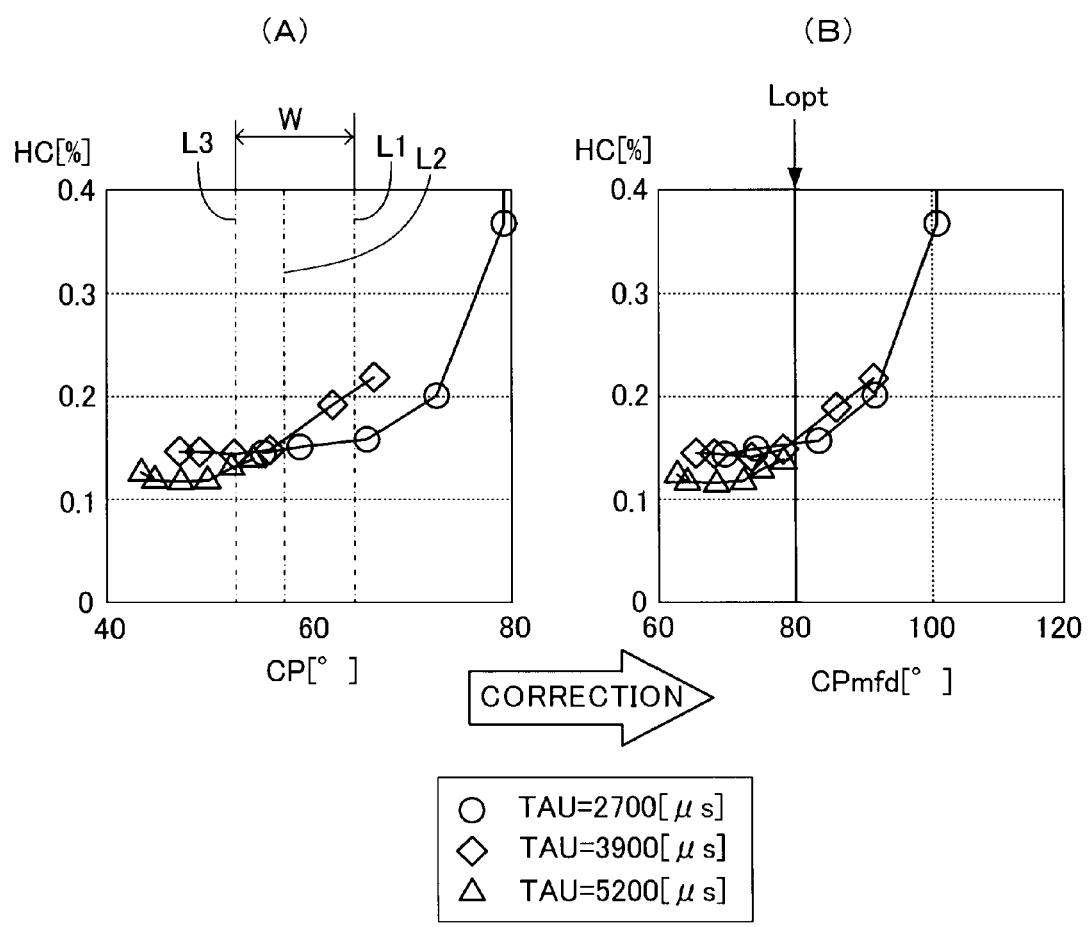
FIG. 6 is a pair of graphs showing, for different fuel injection quantities, the relation between the HC discharge quantity and the full combustion correspondence period, wherein (A) is a graph showing, for different fuel injection quantities, the relation between the HC discharge quantity and the full combustion correspondence period before being modified on the basis of the fuel injection quantity, and (B) is a graph showing, for different fuel injection quantities, the relation between the HC discharge quantity and the full combustion correspondence period after being modified on the basis of the fuel injection quantity.

FIG. 6 is a pair of graphs showing the results of an experiment performed for the engine 10 to confirm the effect of modification of the full combustion correspondence period CP on the basis of the fuel injection quantity TAU. Graph (A) of FIG. 6 shows the results obtained by measuring the relation between the full combustion correspondence period CP before modification and the HC discharge quantity, while changing the fuel injection quantity TAU. In this experiment, the fuel injection quantity (in actuality, fuel injection time approximately proportional to the fuel injection quantity TAU) was set to 2700 μs, 3900 μs, or 5200 μs.

According to graph (A) of FIG. 6, when the fuel injection quantity TAU is changed, the full combustion correspondence period CP at which the HC discharge quantity starts to increase varies as indicated by straight lines L1, L2, and L3.

In other words, the optimal value of the full combustion correspondence period CP changes within a range having a width W.

Graph (B) of FIG. 6 shows the results obtained by measuring the relation between the full combustion correspondence period CPmfd, modified on the basis of the fuel injection quantity TAU, and the HC discharge quantity, while changing the fuel injection quantity TAU. The fuel injection quantity TAU was changed in the same manner as in the case shown in graph (A) of FIG. 6.

From graph (B) of FIG. 6, it is understood that, even when the fuel injection quantity TAU is different, the HC discharge quantity starts to increase at a certain specific value of the modified full combustion correspondence period CPmfd; i.e., at a single point indicated by a straight line Lopt. Accordingly, when the VVT advancement amount is controlled such that the modified full combustion correspondence period CPmfd coincides with the target full combustion correspondence period CPtgt, the overlap period can be prolonged to a possible degree within a range in which the HC discharge quantity (accordingly, the CO discharge quantity) does not increase, irrespective of the fuel injection quantity TAU.

(Modification on the Basis Cylinder Wall Temperature (Cooling Water Temperature THW))

Figure 7:
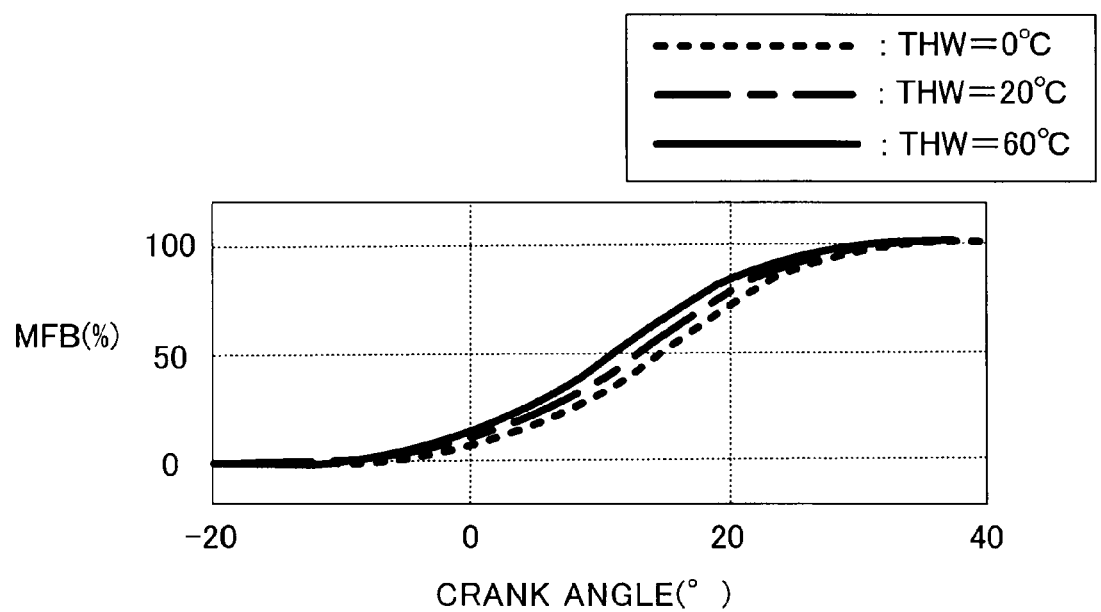
FIG. 7 is a graph showing how the temperature of cooling water affects change in the combustion ratio.

The cylinder wall temperature lowers as the cooling water temperature THW becomes lower. FIG. 7 is a graph showing the change in the combustion ratio MFB under the different cooling water temperatures THW. As the cooling water temperature THW becomes lower, the amount of heat (which is generated within the combustion chamber) which is taken by the cylinder wall becomes greater (that is, the cooling loss becomes greater). Thus, as the cooling water temperature THW becomes lower, the combustion speed decreases. As a result, as shown in FIG. 7, as the cooling water temperature THW becomes lower, the full combustion correspondence period CP becomes longer. Accordingly, in order to control the burnt gas quantity to a proper quantity on the basis of the full combustion correspondence period CP and the target full combustion correspondence period CPtgt, the influence of the cylinder wall temperature (cooling water temperature THW) on the full combustion correspondence period CP must be eliminated.

In view of the above, the present apparatus modifies the full combustion correspondence period in accordance with the following Eq. (4) so that the target full combustion correspondence period CPtgt, which is set under the assumption that the cooling water temperature THW is fixed to a certain value (in the present example, 86° C. which is a temperature after completion of warming up), can be used as a target value of the feedback control as it is (without being changed).

$$CPmfd = CP \cdot \left(1 - \frac{86 - THW}{800}\right) \quad (4)$$

$THW(° C.)$

Figure 8:
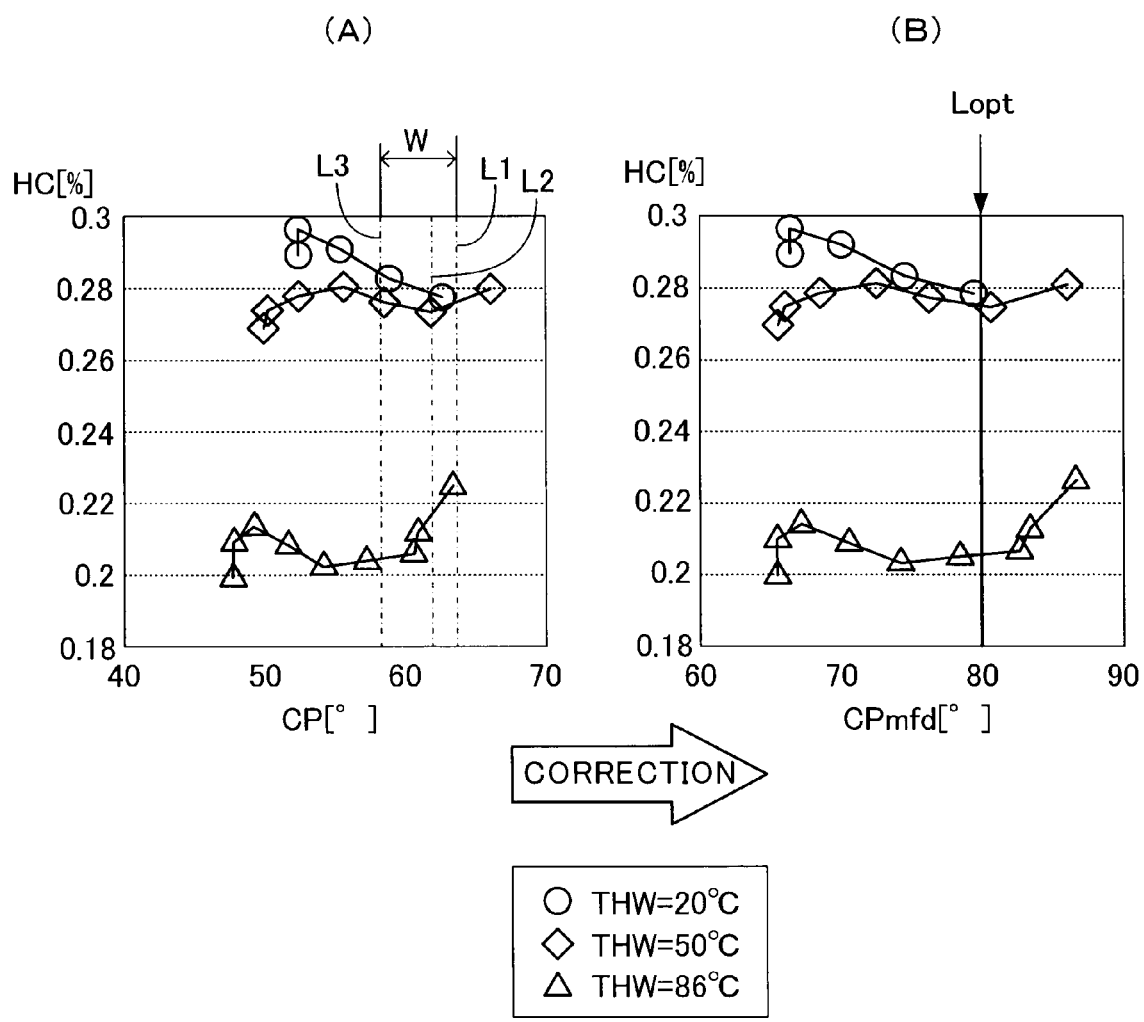
FIG. 8 is a set of graphs showing, for different cooling water temperatures, the relation between the HC discharge quantity and the full combustion correspondence period, wherein (A) is a graph showing, for different cooling water temperatures, the relation between the HC discharge quantity and the full combustion correspondence period before being modified on the basis of the cooling water temperature, and (B) is a graph showing, for different cooling water temperatures, the relation between the HC discharge quantity and the full combustion correspondence period after being modified on the basis of the cooling water temperature.

FIG. 8 is a pair of graphs showing the results of an experiment performed for the engine 10 in order to confirm the effect of modification of the full combustion correspondence period CP on the basis of the cooling water temperature THW. Graph (A) of FIG. 8 shows the results obtained by measuring the relation between the full combustion correspondence period CP before modification and the HC discharge quantity under different cooling water temperatures THW. In this measurement, the cooling water temperature THW was set to 20° C., 50° C., or 86° C.

According to graph (A) of FIG. 8, when the cooling water temperature THW is changed, the value of the full combustion correspondence period CP at which the HC discharge quantity starts to increase varies as indicated by straight lines L1, L2, and L3. In other words, the optimal value of the full combustion correspondence period CP changes within a range having a width W.

Graph (B) of FIG. 8 shows the results obtained by measuring the relation between the full combustion correspondence period CPmfd, modified on the basis of the cooling water temperature THW, and the HC discharge quantity, under different cooling water temperatures THW. The cooling water temperature THW was changed in the same manner as in the case shown in graph (A) of FIG. 8.

From graph (B) of FIG. 8, it is understood that, even when the cooling water temperature THW is different, the HC discharge quantity starts to increase at a certain specific value of the modified full combustion correspondence period CPmfd; i.e., at a single point indicated by a straight line Lopt. Accordingly, when the VVT advancement amount is controlled such that the modified full combustion correspondence period CPmfd coincides with the target full combustion correspondence period CPtgt, the overlap period can be prolonged to a possible degree within a range in which the HC discharge quantity (accordingly, the CO discharge quantity) does not increase, irrespective of the cooling water temperature THW.

(Modification on the Basis of Air-Fuel Ratio A/F)

Figure 9:
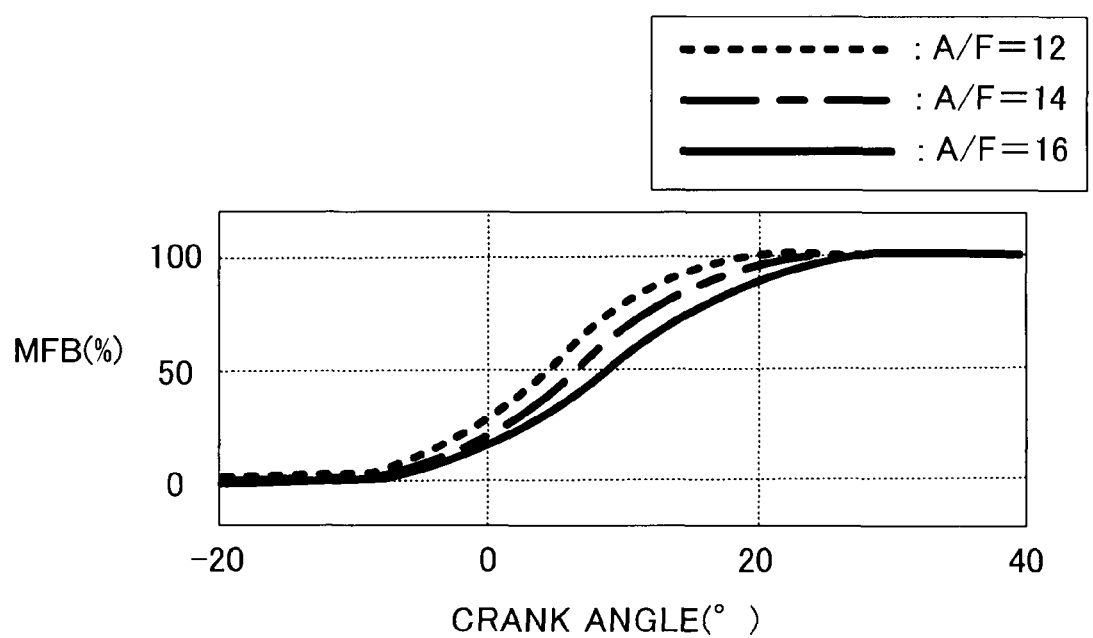
FIG. 9 is a graph showing how the air-fuel ratio affects change in the combustion ratio.

FIG. 9 is a graph showing the change in the combustion ratio MFB under the different air-fuel ratios A/F. As the air-fuel ratio A/F becomes greater (as the air-fuel ratio is shifted toward the leaner side), the degree of instability of combustion becomes greater. Thus, as shown in FIG. 9, the greater the air-fuel ratio A/F, the longer the full combustion correspondence period CP. Accordingly, in order to control the burnt gas quantity to a proper quantity on the basis of the full combustion correspondence period CP and the target full combustion correspondence period CPtgt, the influence of the air-fuel ratio A/F on the full combustion correspondence period CP must be eliminated.

In view of the above, the present apparatus modifies the full combustion correspondence period in accordance with the following Eq. (5) so that the target full combustion correspondence period CPtgt, which is set under the assumption that the air-fuel ratio A/F is fixed to a certain value (in the present example, the stoichiometric air-fuel ratio), can be used as a target value of the feedback control as it is (without being changed).

$$\begin{cases} CPmfd = CP \cdot \dfrac{Qstoich}{Qtotal} \\ Qtotal = Pc(\theta e) \cdot V(\theta e)^\kappa - Pc(\theta s) \cdot V(\theta s)^\kappa \\ Qstoich = 0.19 \cdot TAU \end{cases} \quad (5)$$

$TAU(\mu s)$

In Eq. (5), Qtotal represents a quantity obtained by the same equation as the denominator of the above-described Eq. (1), and is the total quantity Qtotal of heat which is a portion of the all fuel burnt within the combustion chamber and contributed to work for (against) the piston. Qstoich represents the total quantity Qtotal of heat when the air-fuel ratio is equal to the stoichiometric air-fuel ratio, and is obtained by an estimation (approximation) equation (Qstoich=0.19·TAU).

Figure 10:
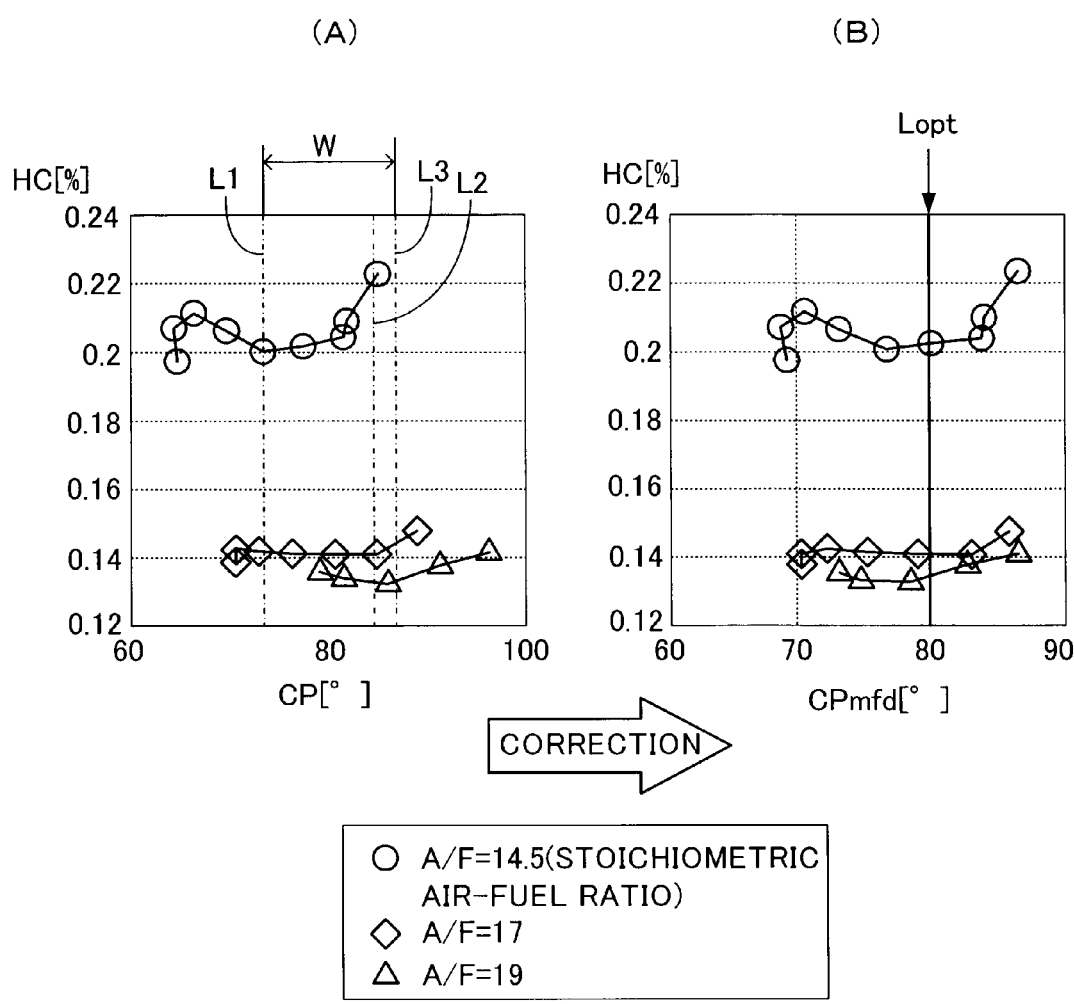
FIG. 10 is a pair of graphs showing, the relation between the HC discharge quantity and the full combustion correspondence period, wherein (A) is a graph showing, for different air-fuel ratios, the relation between the HC discharge quantity and the full combustion correspondence period before being modified on the basis of the air fuel ratio, and (B) is a graph showing, for different air-fuel ratios, the relation between the HC discharge quantity and the full combustion correspondence period after being modified on the basis of the air fuel ratio.

FIG. 10 is a pair of graphs showing the results of an experiment performed for the engine 10 in order to confirm the effect of modification of the full combustion correspondence period CP on the basis of the air-fuel ratio A/F. Graph (A) of FIG. 10 shows the results obtained by measuring the relation between the full combustion correspondence period CP before modification and the HC discharge quantity while changing the air-fuel ratio A/F. In this measurement, the air-fuel ratio A/F was set to 14.5 (stoichiometric air-fuel ratio), 17, or 19.

According to graph (A) of FIG. 10, when the air-fuel ratio A/F is changed, the value of the full combustion correspondence period CP at which the HC discharge quantity starts to increase changes as indicated by straight lines L1, L2, and L3. In other words, the optimal value of the full combustion correspondence period CP changes within a range having a width W.

Graph (B) of FIG. 10 shows the results obtained by measuring the relation between the full combustion correspondence period CPmfd, modified on the basis of the air-fuel ratio A/F, and the HC discharge quantity, under the different air-fuel ratios A/F. The air-fuel ratio A/F was changed in the same manner as in the case shown in graph (A) of FIG. 10.

From graph (B) of FIG. 10, it is understood that, even when the air-fuel ratio A/F is different, the HC discharge quantity starts to increase at a certain specific value of the modified full combustion correspondence period CPmfd; i.e., at a single point indicated by a straight line Lopt. Accordingly, when the VVT advancement amount is controlled such that the modified full combustion correspondence period CPmfd coincides with the target full combustion correspondence period CPtgt, the overlap period can be prolonged to a possible degree within a range in which the HC discharge quantity (accordingly, the CO discharge quantity) does not increase, irrespective of the air-fuel ratio A/F.

The present apparatus performs the modifications based on the fuel injection quantity TAU, the cooling water temperature THW, and the air-fuel ratio A/F in accordance with the following Eq. (6).

$$CPmfd = CP \cdot \left(1 + \dfrac{TAU}{10000}\right) \cdot \left(1 - \dfrac{86 - THW}{800}\right) \cdot \dfrac{Qstoich}{Qtotal} \quad (6)$$

Figure 11:
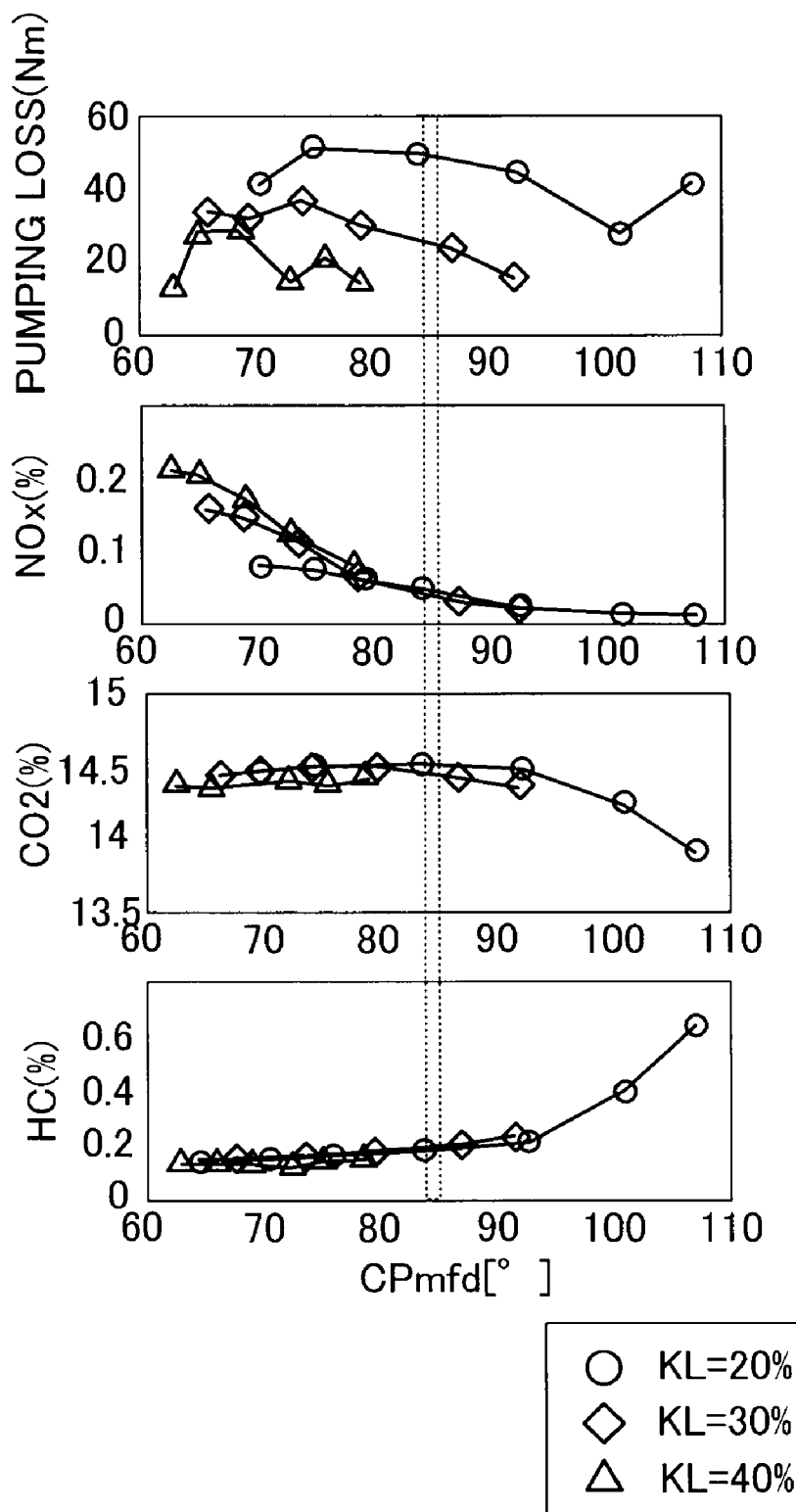
FIG. 11 is a set of graphs showing, for different loads (air filling factors KL), the relation between the modified full combustion correspondence period, and pumping loss and the discharge quantities of exhaust gases (HC, $CO_2$, and $NO_x$).

FIG. 11 shows the relations between the modified (normalized) full combustion correspondence period CPmfd and the pumping loss, between the period CPmfd and the discharge quantities of exhaust gases (HC, $CO_2$, and $NO_x$), under the different loads (in actuality, the air filling factor KL: a value proportional to the quantity of intake air per cylinder). As can be understood from FIG. 11, values of the full combustion correspondence period CPmfd at which the discharge quantities of the exhaust gases start to increase are located approximately at a single point (see a region of FIG. 11 indicated by broken lines). That is, by means of controlling the VVT advancement amount such that the modified full combustion correspondence period CPmfd coincides with a certain target full combustion correspondence period CPtgt (in the example shown in FIG. 11, about)$_{85}°$, pumping loss can be reduced without increasing the discharge quantities of the exhaust gases.

(Actual Operation)

Next, actual operation of the present apparatus will be described. Notably, routines which will be described below are those which the CPU 71 of the electric control apparatus 70 executes for a specific cylinder. The CPU 71 executes similar routines for the remaining cylinders as well.

The CPU 71 executes an unillustrated cylinder pressure acquisition routine every time a period corresponding to a minute crank angle elapses, and stores in the RAM 73 a crank angle θ and a cylinder pressure Pc (θ) at a point in time when that routine is executed.

Figure 12:
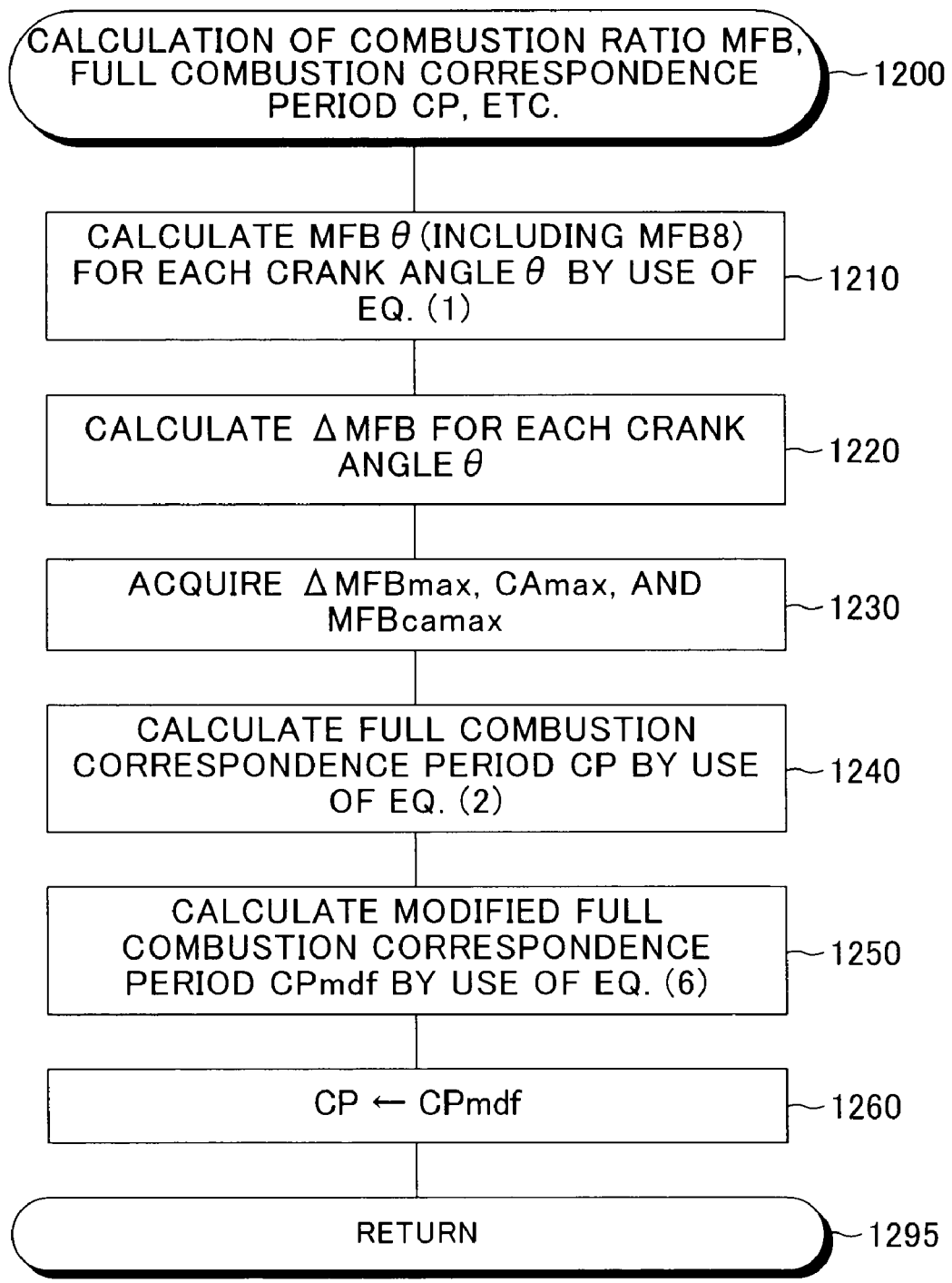
FIG. 12 is a flowchart showing a routine executed by a CPU shown in FIG. 1 so as to obtain the combustion ratio, the full combustion correspondence period, etc.

Further, the CPU 71 repeatedly executes a routine shown in FIG. 12 every time the crank angle coincides with a predetermined angle (e.g., ATDC160°) after substantial completion of the combustion stroke. Accordingly, when a predetermined timing comes, the CPU 71 starts the processing of the routine of FIG. 12 from step 1200. The CPU 71 performs the following processing in step 1210 to step 1260, and then proceeds to step 1295 so as to end the current execution of the present routine.

Step 1210: the CPU 71 calculates a combustion ratio MFBθ for each of crank angles θ (crank angles at intervals corresponding to the minute crank angle) by use the above-described Eq. (1). The 8° combustion ratio MFB8 is contained in the calculated combustion ratios MFBθ.

Step 1220: the CPU 71 calculates, for each of the crank angles θ, a change amount ΔMFB of the combustion ratio MFB within a N° extent (here, a crank angle extent of)15° using the combustion ratios MFBθ calculated in step 1210. That is, the change amount ΔMFB is calculated by the following equation.

$$\Delta MFB = \Delta MFB(\theta) = MFB\theta - MFB\theta b \text{ (where } \theta b = \theta - N\text{)}$$

Step 1230: the CPU 71 obtains the largest value (combustion ratio maximum change speed ΔMFBmax) of the combustion ratio change amounts ΔMFB calculated in step 1220. Further, the CPU 71 obtains a crank angle θ corresponding to the combustion ratio maximum change speed ΔMFBmax as a crank angle CAmax, and obtains a combustion ratio MFB (=MFB(CAmax)) at the crank angle CAmax, as an MFBcamax (see FIG. 2).

Step 1240: the CPU 71 estimates (calculates) the full combustion correspondence period CP by applying to the above-described Eq. (2) the various values obtained in step 1230 and the ignition timing SA for the latest combustion.

Step 1250: the CPU 71 modifies, by making use of the above-described Eq. (6), the full combustion correspondence period CP estimated in step 1240. It should be noted that Qtotal and Qstoich are calculated by Eq. (5). The cooling water temperature THW is acquired from the cooling water temperature sensor 66. The fuel injection quantity TAU is the quantity of injected fuel which formed a gas mixture provided in the previous combustion stroke, and has been stored in the RAM 73.

Step 1260: the CPU 71 stores the modified full combustion correspondence period CPmfd obtained in step 1250 as the full combustion correspondence period CP for feedback control.

Figure 13:
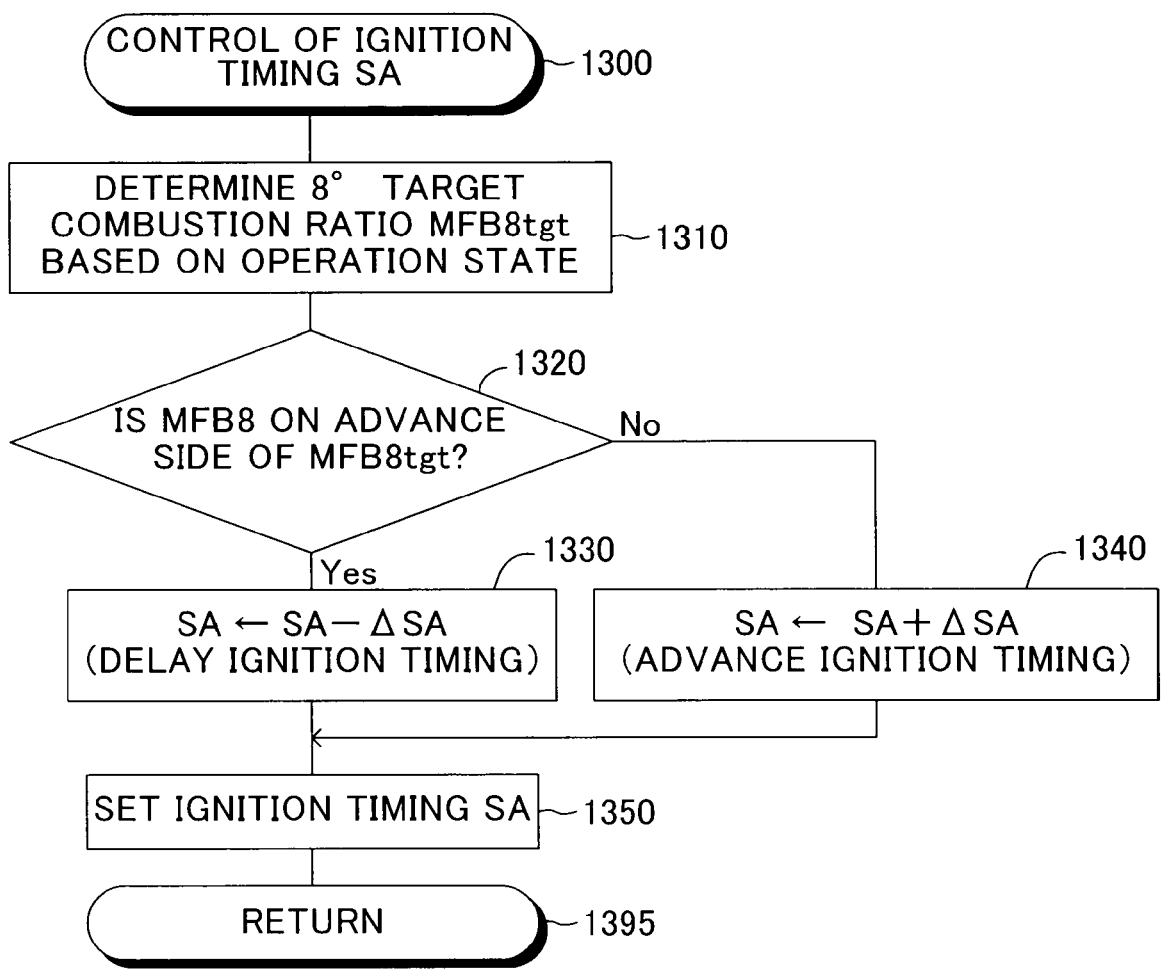
FIG. 13 is a flowchart showing a routine executed by the CPU shown in FIG. 1 so as to control the ignition timing (to perform MBT control).

Meanwhile, the CPU 71 repeatedly executes a routine shown in FIG. 13 every time the crank angle coincides with a predetermined crank angle (e.g., BTDC90°). Accordingly, when a predetermined timing comes, the CPU 71 starts the processing of the routine of FIG. 13 from step 1300, and then proceeds to step 1310 so as to determine an 8° target combustion ratio MFB8tgt on the basis of the operation state (parameters representing the operation state of the engine 10). The parameters representing the operation state include an intake air quantity Ga (or accelerator pedal operation amount Accp, that is, engine load) and the engine rotational speed NE. Other parameters, such as the cooling water temperature THW, may be added as the parameters representing the operation state.

Subsequently, the CPU 71 proceeds to step 1320, and determines whether or not the 8° combustion ratio MFB8 calculated in the previously described step 1210 of FIG. 12 is located on the advance side of (or greater than) the 8° target combustion ratio MFB8tgt. If the 8° combustion ratio MFB8 is on the advance side of (or greater than) the 8° target combustion ratio MFB8tgt, the CPU 71 proceeds from step 1320 to step 1330, and retards the ignition timing SA by a minute angle ΔSA. On the other hand, if the 8° combustion ratio MFB8 is on the delay side of (or smaller than) the 8° target combustion ratio MFB8tgt, the CPU 71 proceeds from step 1320 to step 1340, and advances the ignition timing SA by the minute angle ΔSA.

After that, the CPU 71 proceeds to step 1350, and performs setting such that ignition is performed at the ignition timing SA determined in step 1330 or step 1340. Subsequently, the CPU 71 proceeds to step 1395 so as to end the current execution of the present routine. By virtue of the above-described processing, the ignition timing SA is feedback-controlled in such a manner that the 8° combustion ratio MFB8 becomes equal to the 8° target combustion ratio MFB8tgt.

Figure 14:
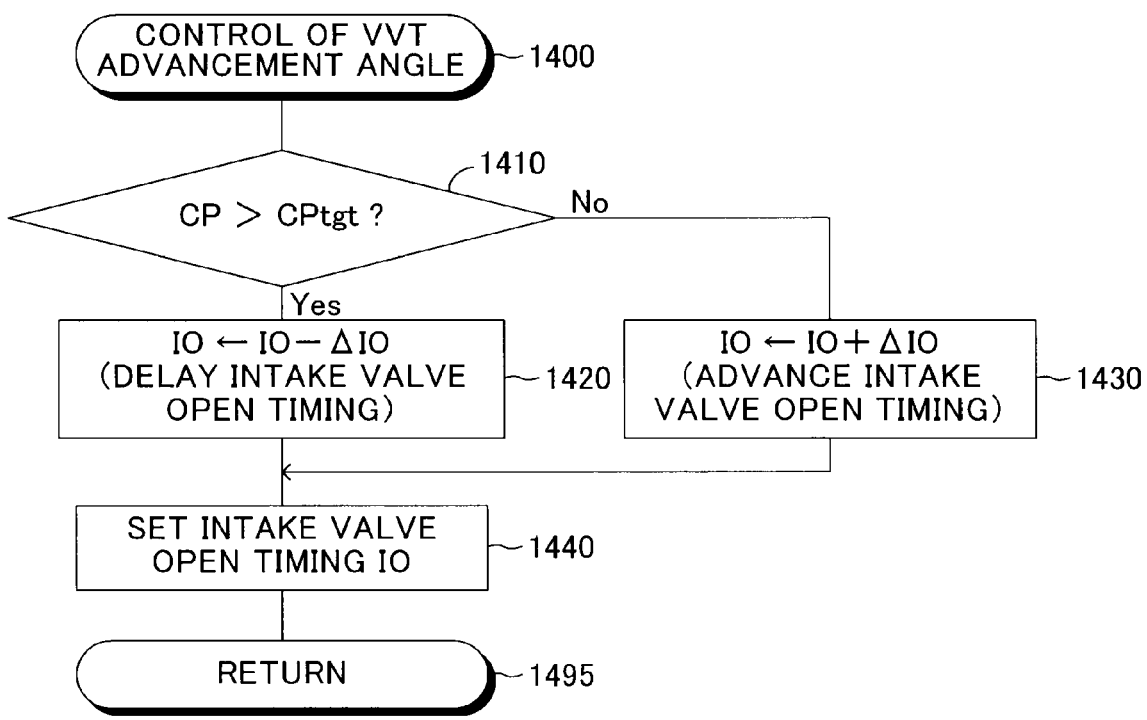
FIG. 14 is a flowchart showing a routine executed by the CPU shown in FIG. 1 so as to control the VVT advancement amount (the intake valve open timing, the overlap period, the burnt gas quantity).
Figure 15:
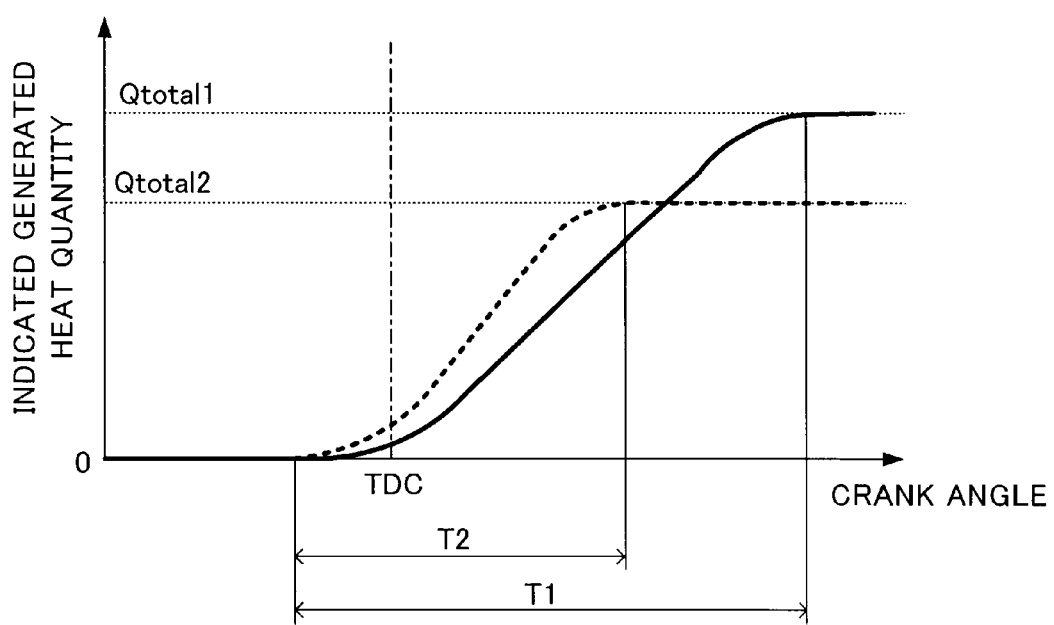
FIG. 15 is a graph showing a change in combustion ratio with respect to crank angle in a combustion stroke.

In addition, the CPU 71 repeatedly executes a routine shown in FIG. 14 every time the crank angle coincides with a predetermined crank angle (for example, a predetermined crank angle after substantial completion of the combustion stroke (e.g., ATDC90°)). Accordingly, when a predetermined timing comes, the CPU 71 starts the processing of the routine of FIG. 14 from step 1400, and then proceeds to step 1410 so as to determine whether or not the full combustion correspondence period CP obtained in the previously described step 1260 (the full combustion correspondence period CP for feedback control=the modified full combustion correspondence period CPmfd) is longer than the target full combustion correspondence period CPtgt.

The target full combustion correspondence period CPtgt is predetermined to be equal to a full combustion correspondence period CP corresponding to the longest overlap period (the most advanced VVT advancement amount) within a range in which the HC and CO discharge quantities do not increase, when the fuel injection quantity TAU is a standard fuel injection quantity TAU0 (e.g., 0 μs), the cooling water temperature THW is a standard water temperature THW0 (e.g., 86° C.), and the air-fuel ratio A/F is a standard air-fuel ratio AF0 (e.g., the stoichiometric air-fuel ratio).

At this time, if the full combustion correspondence period CP is longer than the target full combustion correspondence period CPtgt, it means that the combustion speed is excessively low (the burnt gas quantity is excessively large). Accordingly, the CPU 71 proceeds to step 1420, and delays or retards the intake valve open timing IO by a predetermined amount ΔIO so as to shorten the overlap period to thereby increase the combustion speed. That is, the CPU 71 reduces the VVT advancement amount. To the contrary, if the full combustion correspondence period CP is shorter than the target full combustion correspondence period CPtgt, it means that the combustion speed is excessively high (the burnt gas quantity is excessively small). Accordingly, the CPU 71 proceeds to step 1430, and advances the intake valve open timing IO by the predetermined amount ΔIO so as to extend the overlap period to thereby decrease the combustion speed. That is, the CPU 71 increases the VVT advancement amount.

Subsequently, the CPU 71 proceeds to step 1440, and sets the intake valve open timing IO such that the intake valve 32 opens at the intake valve open timing IO determined in the above-described step 1420 or 1430. As a result, the intake valve control apparatus 33 opens the intake valve 32 at the set intake valve open timing IO. It should be noted that the intake valve control apparatus 33 closes the intake valve 32 at an intake valve close timing IC, which is obtained by adding a fixed intake valve open angle IOθ to the intake valve open timing IO.

As a result of the above-described processing, the overlap amount becomes appropriate, and the burnt gas quantity becomes an appropriate quantity. Accordingly, the $NO_X$ discharge quantity can be reduced without increasing the HC and CO discharge quantities. Also, pumping loss can be reduced. Therefore, the fuel consumption of the engine 10 is improved. Further, since the ignition timing SA is changed in such a manner that the 8° combustion ratio MFB8 becomes equal to the 8° target combustion ratio MFB8tgt, the combustion efficiency increases, whereby the torque of the engine 10 can be increased, and fuel consumption can be improved.

The present invention is not limited to the above-described embodiments, and various modifications can be employed within the scope of the present invention. For example, in the above-described embodiment, the intake valve control apparatus 33 is configured to adjust the open and close timings of the intake valve 32 only. However, the intake valve control apparatus 33 may be configured to adjust the maximum lift amount during the open period of the intake valve 32. Further, the intake valve control apparatus 33 may be configured such that it can adjust the open and close timings of the intake valve 32 independently of each other. Moreover, in the above-described embodiments, in addition to the intake valve control apparatus 33, an exhaust valve control apparatus may be provided so as to independently adjust the close timing, the open timing, the lift amount during the open period, etc. of the exhaust valve 35.

Further, in the above-described embodiment, the fuel injection quantity TAU, the cooling water temperature THW, and the air-fuel ratio NF are employed as the parameters which affect the combustion speed, and the full combustion correspondence period CP is modified by use of all of them (see Eq. (6)). However, the full combustion correspondence period CP may be modified on the basis of any one of these parameters or a combination of arbitrary two parameters selected from these parameters. Moreover, the full combustion correspondence period CP may be modified on the basis of any one or any combination of the property of fuel, the size of droplets of fuel, and the amount of alcohol contained in fuel, which are parameters which affect the combustion speed.

Moreover, in the above-described embodiment, the full combustion correspondence period CP estimated by the above-described Eq. (6) is modified on the basis of parameters which affect the combustion speed. Instead, the target full combustion correspondence period CPtgt may be modified on the basis of parameters which affect the combustion speed. Further, the embodiment may be modified so as to obtain the full combustion correspondence period CP in unit of time, and convert it to a value in unit of crank angle by use of the engine rotational speed NE at that point in time. Further, the embodiment may be configured to obtain the combustion ratio MFB (accordingly, the ratio of indicated heat quantity Qsum/Qtotal) by use of a combustion model called the "Wiebe function" (see, for example, Japanese Patent Application Laid-Open (koka) No. 2006-9720). In addition, in the above-described embodiment, the burnt gas quantity is controlled by changing the VVT advancement amount (the overlap period). However, in place thereof or in addition thereto, the burnt gas quantity can be adjusted by an external EGR device.

The invention claimed is:

1. A control apparatus for an internal combustion engine, comprising:
cylinder pressure detection means for detecting a cylinder pressure, which is a pressure within a combustion chamber of the internal combustion engine;
means for obtaining a combustion ratio on the basis of the detected cylinder pressure, the combustion ratio being a ratio of, a cumulative quantity of fuel which is a portion of fuel bunt within the combustion chamber until a predetermined timing and which contributed to work for a piston, to the total quantity of fuel which is a portion of all fuel bunt within the combustion chamber and which contributed to work for the piston;
ignition means for controlling ignition timing of the engine such that the obtained combustion ratio coincides with a predetermined target combustion ratio and for igniting a gas mixture within the combustion chamber of the engine at the controlled ignition timing;
full-combustion-correspondence-period estimation means for estimating a full combustion correspondence period on the basis of the ignition timing and the acquired combustion ratio, the full combustion correspondence period being a period from the ignition timing to a combustion completion time at which combustion of the gas mixture within the combustion chamber ends; and
burnt-gas-quantity control means for controlling a quantity of a burnt gas contained in the gas mixture such that the estimated full combustion correspondence period coincides with a target full combustion correspondence period.

2. A control apparatus for an internal combustion engine according to claim 1, wherein the burnt-gas-quantity control means is configured to change an overlap period in which both intake and exhaust valves are open.

3. A control apparatus for an internal combustion engine according to claim 2, wherein the burnt-gas-quantity control means is configured to change the overlap period by changing at least the open timing of the intake valve of the engine.

4. A control apparatus for an internal combustion engine according to any one of claim 1 to 3, wherein the full-combustion-correspondence-period estimation means includes:
means for obtaining a parameter which affects combustion speed of the fuel; and
full-combustion-correspondence-period modification means for modifying the full combustion correspondence period on the basis of the acquired parameter.

5. A control apparatus for an internal combustion engine according to any one of claim 1 to 3, wherein the burnt-gas-quantity control means includes:
means for obtaining a parameter which affects combustion speed of the fuel; and
target modification means for modifying the target full combustion correspondence period on the basis of the acquired parameter.

6. A control apparatus for an internal combustion engine, comprising:
ignition means for igniting a gas mixture within a combustion chamber of the engine at an ignition timing corresponding to an operation state of the engine;
full-combustion-correspondence-period estimation means for estimating a full combustion correspondence period, which is a period from the ignition timing to a combustion completion time at which combustion of the gas mixture within the combustion chamber ends; and burnt-gas-quantity control means for controlling a quantity of a burnt gas contained in the gas mixture such that the estimated full combustion correspondence period coincides with a target full combustion correspondence period, wherein the control apparatus further comprises cylinder pressure detection means for detecting a cylinder pressure, which is a pressure within the combustion chamber; and the full-combustion-correspondence-period estimation means is configured to estimate, on the basis of the detected cylinder pressure, an indicated heat quantity ratio corresponding to a ratio Qsum/Qtotal, which is a ratio of, a cumulative quantity Qsum of heat which is a portion of heat generated by fuel bunt within the combustion chamber until a predetermined timing and which was converted to work for a piston, to the total quantity Qtotal of heat which is a portion of heat generated by all fuel bunt within the combustion chamber and which was converted to work for the piston; obtain the maximum value of a change amount of the indicated heat quantity ratio Qsum/Qtotal in a predetermined crank angle extent; and estimate the combustion completion time on the basis of the maximum value.

7. A control apparatus for an internal combustion engine according to claim 6, wherein the full-combustion-correspondence-period estimation means is configured to obtain, as the indicated heat quantity ratio Qsum/Qtotal, a combustion ratio as a function of the crank angle, the combustion ratio being a ratio of, a cumulative quantity of fuel which is a portion of fuel bunt within the combustion chamber until a predetermined timing and which contributed to work for the piston, to the total quantity of fuel which is a portion of all fuel bunt within the combustion chamber and which contributed to work against the piston.

8. A control apparatus for an internal combustion engine according to claim 6 or 7, wherein the full-combustion-correspondence-period estimation means includes:

means for obtaining a parameter which affects combustion speed of the fuel; and full-combustion-correspondence-period modification means for modifying the full combustion correspondence period on the basis of the obtained parameter.

9. A control apparatus for an internal combustion engine according to claim 6 or 7, wherein the burnt-gas-quantity control means includes:

means for obtaining a parameter which affects combustion speed of the fuel; and target modification means for modifying the target full combustion correspondence period on the basis of the acquired parameter.

10. A control apparatus for an internal combustion engine according to claim 7, wherein the ignition means includes ignition timing control means for controlling the ignition timing such that the combustion ratio at a predetermined crank angle coincides with a target combustion ratio determined in accordance with the operation state of the engine.

* * * * *